United States Patent [19]

Shimada et al.

[11] Patent Number: 5,057,945

[45] Date of Patent: Oct. 15, 1991

[54] SIGNAL RECORDING/REPRODUCING APPARATUS

[75] Inventors: Toshiyuki Shimada; Kazuhiro Aoki, both of Osaka; Akira Kurahashi, Kyoto; Noboru Kikuchi, Osaka, all of Japan

[73] Assignee: Matsushita Electric Industrial Co., Ltd., Japan

[21] Appl. No.: 531,430

[22] Filed: May 31, 1990

[30] Foreign Application Priority Data

Jun. 2, 1989 [JP] Japan .................. 1-141673

[51] Int. Cl.$^5$ .................. G11B 5/02; G11B 15/12
[52] U.S. Cl. .................. 360/22; 360/61; 360/63; 360/67
[58] Field of Search .................. 360/61, 63, 67, 124, 360/22, 90

[56] References Cited

U.S. PATENT DOCUMENTS 4,152,736  5/1979  Jansen et al. .................. 360/78
4,199,793  4/1980  Baldwin .................. 360/84

FOREIGN PATENT DOCUMENTS 2601448  8/1976  Fed. Rep. of Germany .
2083666  3/1982  United Kingdom .

OTHER PUBLICATIONS

"Magnetic Recording Handbook" pp. 318-320, pp. 330-334.
"3.5 Inch 16 MBYTE Floppy Disk Drive" by S. Yoshida, M. Wakabayashi, T. Inaji, T. Yoshiura, S. Matsukawa, H. Onodera, Aug. 1989, IEEEE, pp. 672-681.

Primary Examiner—John H. Wolff
Assistant Examiner—Varsha V. Sheladia
Attorney, Agent, or Firm—Lowe, Price, LeBlanc & Becker

[57] ABSTRACT

A signal recording/reproducing apparatus equipped with a recording head section for recording signals on a recording medium and a reproducing head section for reproducing the signals recorded on the recording medium. The recording head section is arranged to record the signal to form N recording sub-tracks on the recording medium and the reproducing head section has M reproducing sub-heads which trace the N recording sub-tracks to reproduce the recording signal. The pitch of the M sub-heads thereof is equal to a pitch of the recording sub-tracks and the number M of the sub-heads is greater than the number N of the recording sub-tracks. The reproducing head section is coupled to a reproduction signal detecting section which is turn eliminates the interference and the crosstalk between adjacent tracks from the reproduced signal due to the reproducing head section. This arrangement allows narrowing the track pitch to increase the recording capacity and extremely improving the transfer rate concurrently with the elimination of the interference between the adjacent codes and crosstalk between the adjacent tracks.

13 Claims, 23 Drawing Sheets

FIG. 21(a) CLK 2 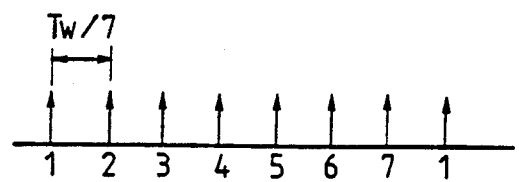

FIG. 21(b) SYNCHRONIZING SIGNAL 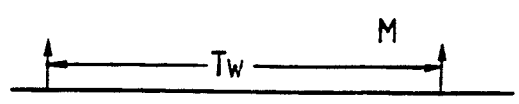

FIG. 21(c) OUTPUT OF EQUALIZER 27 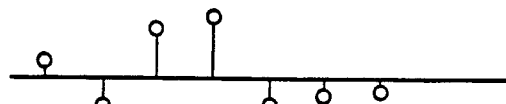

FIG. 21(d) OUTPUT OF BPF 60 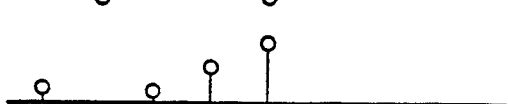

FIG. 21(e) OUTPUT OF MULTIPLIER 61 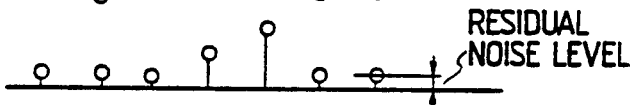

FIG. 21(f) OUTPUT OF LPF 64 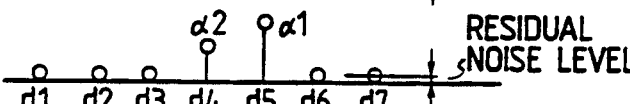

FIG. 21(g) OUTPUT OF COMPARATOR 71 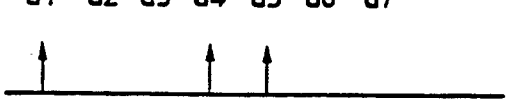

FIG. 21(h) OUTPUT OF DOWN COUNTER 74 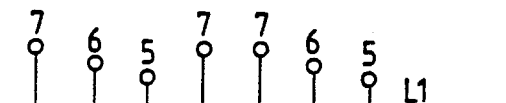

FIG. 21(i) OUTPUT OF SAMPLING & HOLDING CKT 68 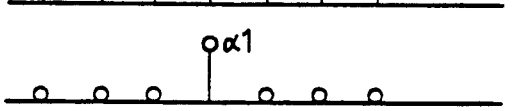

FIG. 21(j) OUTPUT OF SAMPLING & HOLDING CKT 69 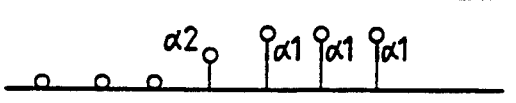

FIG. 21(k) OUTPUT OF SAMPLING & HOLDING CKT 70 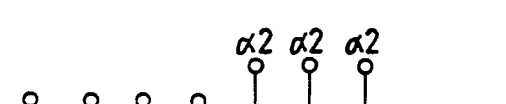

FIG. 21(l) OUTPUT OF COMPARATOR 72 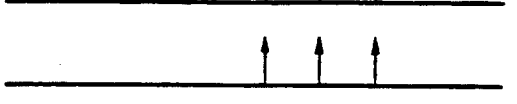

FIG. 21(m) SW 75 CONTROL SIGNAL 

FIG. 21(n) SW 76 CONTROL SIGNAL 

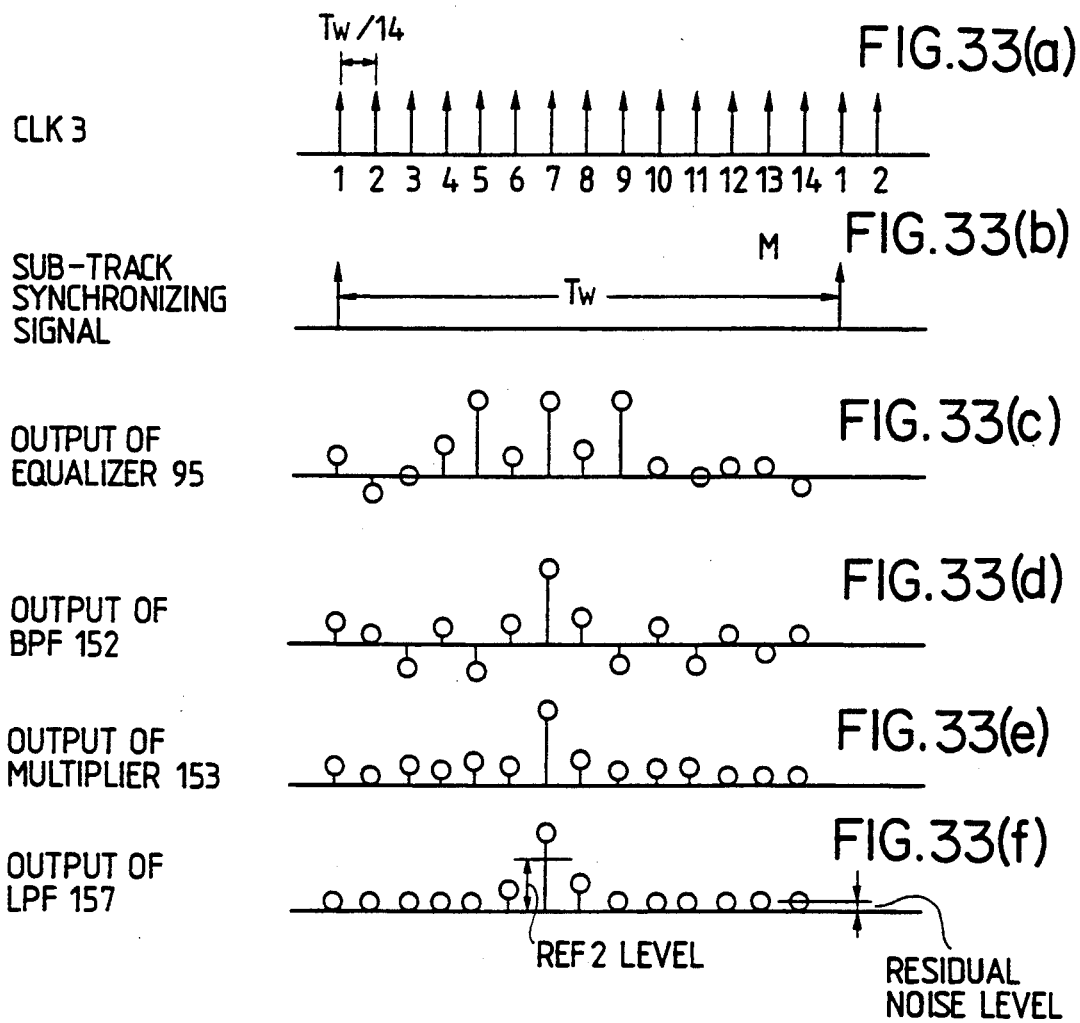

SIGNAL RECORDING/REPRODUCING APPARATUS

BACKGROUND OF THE INVENTION

The present invention relates to a signal recording-/reproducing apparatus for high-density recording/reproducing of data.

Recently, improvement for digital magnetic recording/reproducing apparatus such as floppy disk apparatus is being made for recording-capacity increasing purposes. This is also being made for magnetic tape apparatus and hard disk apparatus. For increasing the recording capacity in the magnetic recording/reproducing apparatus, required is heightening the area recording density of the recording medium, which in turn depends upon improvement of the linear density in the track longitudinal directions and improvement of the latitudinal-direction density due to narrowing the track pitch. For example, in order to meet the requirement of heightening the linear recording density, an equalizer is used for suppressing the interference between codes in a reproduced signal, and on the other hand, for improving the track density, high-accuracy tracking servo techniques for recording/reproducing heads have been developed. The conventional track-density improving techniques are exemplified by description in reports such as "High-Density Floppy Desk, Realizing High Track Density by Tracking Servo Technique Based upon Modern Control Theory" (Nikkei Electronics, No. 431, P181-194, Oct. 5, 1988) and "Matsushita Electric Industrial Co., Ltd has also Manufactured 16-Mbyte Capacity and 50-msec average access time 3.5 Inch Floppy Disk Drive" (Nikkei Electronics, No. 460, P98-99, Nov. 14, 1988), where for narrowing the track pitch the recording/reproducing head is tracking-controlled by means of a mechanical drive system. One example of the conventional techniques will be described hereinbelow with reference to FIGS. 1 to 3. In FIG. 1 showing an arrangement of the conventional signal recording/reproducing apparatus, illustrated at numeral 1 is a recording medium which is rotatable at a constant speed of 360 revolutions per minute by means of a recording medium drive device 2. As shown in FIG. 2, recording data are recorded on the recording medium 1 so as to form concentrically circled recording tracks each comprising sectors. The recording/reproducing of the data is effected in units of sector. As illustrated in FIG. 3, in each sector is pre-recorded sector servo information which is padding servo data for detection of a tracking signal for a recording/reproducing head. Data writing is not performed for the region of the sector servo information and the sector servo information is reproduced in synchronism with the rotation of the recording medium 1 even during recording. In FIG. 3, character WT represents a track width and character PT designates a track pitch.

Returning again to FIG. 1, a recording/reproducing head 3 is arranged to be brought into contact with the recording medium 1 and to be positioned by a head drive section 4 so as to be relatively movable with respect to the recording medium 1 in longitudinal directions of tracks forming concentric circles as illustrated in FIG. 2. The recording/reproducing head 3 is arranged to be selectively coupled through a switch 5 to a recording amplifier 6 and a reproducing amplifier 7, that is, the switch 5 performs switching operation so that the recording/reproducing head 3 is coupled to the recording amplifier 6 during recording and on the other hand switchable to be coupled to the reproducing amplifier 7 during reproducing as illustrated in FIG. 1. The reproducing amplifier 7 is coupled to a head control circuit 8 which is responsive to the output thereof so as to detect the sector servo information to check the difference in position between the recording/reproducing head 3 and the recording track of the recording medium 1. The output of the head control circuit 8 which represents the position difference therebetween is supplied to the above-mentioned head drive section 4. The head control circuit 8, together with the head drive section 4, makes up a head control section which performs control so that the output level of the head control circuit 8 becomes small, that is, the recording/reproducing head 3 follows the recording track.

During recording, the parallel data of the recording data for which error correction code control (which will hereinafter be referred to as ECC) process are effected are inputted to a recording-data processer 9. The recording-data processor 9 performs modulation such as run length limited code (2, 7), which will hereinafter be referred to as RLLC(2,7), with respect to the inputted parallel data and then outputs serial data to the recording amplifier 6. The recording amplifier 6 current-drives the recording/reproducing head 3 in accordance with the recording data for recording. On the other hand, for reproducing, the reproducing amplifier 7 amplifies and outputs a reproduction signal due to the recording/reproducing head 3, the outputted reproduction signal being supplied to a data detection section 10 so as to detect the data signal. The detected data signal is fed to a format controller 11 which performs demodulation such as RLLC(2, 7) with respect thereto to obtain the original recording data which are in turn ECC-processed, for example.

Here, although a tracking error of about 20 microns generally occurs because of eccentricity in mounting the recording medium on the apparatus and the difference in position between the recording track and the reproducing track due to deformation of the recording medium, the tracking error can be reduced up to below 2 microns by means of the above-described processes. In this case, the minimum track pitch which can be realized is about 45 microns whereby the track density can reach 400 to 500 tracks per inch. When the linear recording density in the track longitudinal direction is 35 Kbits per inch and recording is performed for both surfaces of a floppy disk whose diameter is 3.5 inches, the recording capacity results in being about 10 Mbytes. Generally, the prior art utilizes mechanical means in order to narrow the track pitch. That is, the mechanical accuracy is arranged to be increased or a mechanical control such as tracking control is executed, thereby resulting in increase of the track density.

For further enhancing the recording capacity, there is a problem which arises with such a conventional signal recording/reproducing apparatus, however, in that the recording format used therein provides difficulty to realize the follow error below 2 microns to make it difficult to allow a narrow track pitch below 10 microns. For example, the size of the recording/reproducing head may be decreased in accordance with the thin-film technology so that the recording track width reaches below 10 microns. Illustratively, a multi-track thin-film head may be used to decrease the track pitch up to about 10 microns. Although the track pitch narrowing depends upon the fabrication accuracy of the thin film, there is a possibility that the track pitch may be further decreased in the future. However, an important problem for narrowing the track pitch in the conventional techniques relates to improvement of the mechanical accuracy including the tracking control accuracy, rather than the size-reduction. In addition, another problem relates to difficulty to meet the recent requirement for increasing the transfer rate in units of time. In the conventional technique, although for improving the transfer rate it is required to heighten the relative speed of the recording medium to the recording/reproducing head, difficulty is encountered to increase the relative speed thereof concurrently with performing the tracking control of the recording/reproducing head, particularly, in the apparatus such as floppy disk system in which the recording/reproducing head is arranged to be brought into contact with the recording medium.

SUMMARY OF THE INVENTION

It is therefore an object of the present invention to provide a signal recording/reproducing apparatus which is capable of extremely reducing the track pitch to improve the recording capacity concurrently with considerably increasing the transfer rate.

In order for achieving the above-mentioned object, the signal recording/reproducing apparatus according to the present invention basically comprises a recording head section for recording a recording signal to form N recording sub-tracks on a recording medium, a reproducing head section having M reproducing sub-heads which trace the N recording sub-tracks to reproduce the recording signal, a head drive section for driving the recording head section and the reproducing head section, and a reproduction signal detecting section for eliminating the intersymbol interference (which will hereinafter referred to as an ISI) and the crosstalk from the reproduced signal due to the reproducing head section.

This arrangement allows narrowing the track pitch to increase the recording capacity, extremely improving the transfer rate concurrently with the elimination of the ISI from the adjacent codes and the crosstalk from the adjacent tracks. According to this invention, electrically controlled tracking can be realized so as to eliminate the crosstalk and interference between adjacent tracks, thereby narrowing the track pitch concurrently with significantly improving the data transfer rate. Mechanical tracking accuracy sufficient for the execution of such electrical tracking is obtained upon satisfying the condition that the recorded track region of the N sub-tracks recorded on the recording medium is reproduced by means of a reproducing head comprising M sub-heads whose area is wider than the recording track region. The electrical tracking, with an M-subtrack region covering the recorded N-subtrack region, allows the relatively rough accuracy of the mechanical tracking to be used. This means that the offtrack amount can be greater than the subtrack pitch. With this condition, it is possible to narrow considerably the sub-track pitch.

In accordance with the present invention, there is provided a signal recording/reproducing apparatus comprising: a recording head section having recording sub-heads for recording signals inputted from an external circuit to simultaneously form a recording tracks comprising recording sub-tracks, whose number is N, on a recording medium; a reproducing head section for simultaneously tracing, for reproduction, the recording sub-tracks formed on the recording medium, the reproducing head section having reproducing sub-heads whose number is M and whose pitch is equal to a pitch of the recording sub-tracks, the number M of the reproducing sub-heads being greater than the number N of the recording sub-tracks; and a reproduction signal detecting section for detecting the recorded signals from the reproduced signals due to said M reproducing sub-heads.

Preferably, the reproduction signal detecting section includes: M-channel reproducing amplifiers coupled to the reproducing head section for amplifying the reproduced signals corresponding to the N sub-tracks on the recording medium; analog switch means for time-division-multiplexing the outputs of the M-channel reproducing amplifiers; analog-to-digital converter means for sampling and quantizing the output of the analog switch means; equalizer means for performing an equalization of the output of the analog-to-digital converter means with a same characteristic; crosstalk detector means for detecting a crosstalk level signal from the output of the analog-to-digital converter means or the output of the equalizer means; and crosstalk canceller means for separately deriving the reproduced sub-track signals from the output of the equalizer means in accordance with the detected crosstalk level signal. Further, the reproduction signal detecting section includes: M-channel reproducing amplifiers coupled to the reproducing head section for amplifying the reproduced signals corresponding to the N sub-tracks on the recording medium; analog switch means for time-division-multiplexing the outputs of the M-channel reproducing amplifiers; analog-to-digital converter means for sampling and quantizing the output of the analog switch means; crosstalk canceller means for separately deriving the reproduced sub-track signals from the output of the equalizer means in accordance with a crosstalk level signal; crosstalk detector means for detecting a crosstalk level on the basis of the output signal of the crosstalk canceller means; and accumulator means for low-frequency-filtering and accumulating the output of the crosstalk detector means so as to produce the crosstalk level signal which is in turn supplied to the crosstalk canceller means.

In accordance with the present invention, there is further provided a signal recording/reproducing apparatus comprising: a recording head section having recording sub-heads for recording signals inputted from an external circuit to simultaneously form a recording tracks comprising recording sub-tracks, whose number is N, on a recording medium; a reproducing head section for simultaneously tracing, for reproduction, the recording sub-tracks formed on the recording medium, the reproducing head section having reproducing sub-heads whose number is K and whose pitch is equal to $\frac{1}{2}$ of a pitch of the recording sub-tracks, the number K of said reproducing sub-heads being greater than twice the number N of the recording sub-tracks; and a reproduction signal detecting section for detecting the recorded signals from the reproduced signals due to the K reproducing sub-heads.

Similarly, the reproduction signal detecting section includes: K-channel reproducing amplifiers coupled to the reproducing head section for amplifying the reproduced signals corresponding to the N sub-tracks on the recording medium; analog switch means for time-division-multiplexing the outputs of the K-channel reproducing amplifiers; analog-to-digital converter means for sampling and quantizing the output of the analog switch means; equalizer means for performing an equalization of the output of the analog-to-digital converter means with a same characteristic; crosstalk detector means for detecting a crosstalk level signal from the output of the analog-to-digital converter means or the output of the equalizer means; and crosstalk canceller means for separately deriving the reproduced sub-track signals from the output of the equalizer means in accordance with the detected crosstalk level signal.

BRIEF DESCRIPTION OF THE DRAWINGS

The object and features of the present invention will become more readily apparent from the following detailed description of the preferred embodiments taken in conjunction with the accompanying drawings in which:

FIGS. 21a to 21n are a timing chart for understanding of operation of the crosstalk detector;

FIGS. 33a to 33f are a timing illustration for understanding of operation of the crosstalk detector of the reproduction signal detecting section.

DETAILED DESCRIPTION OF THE INVENTION

Figure 4:
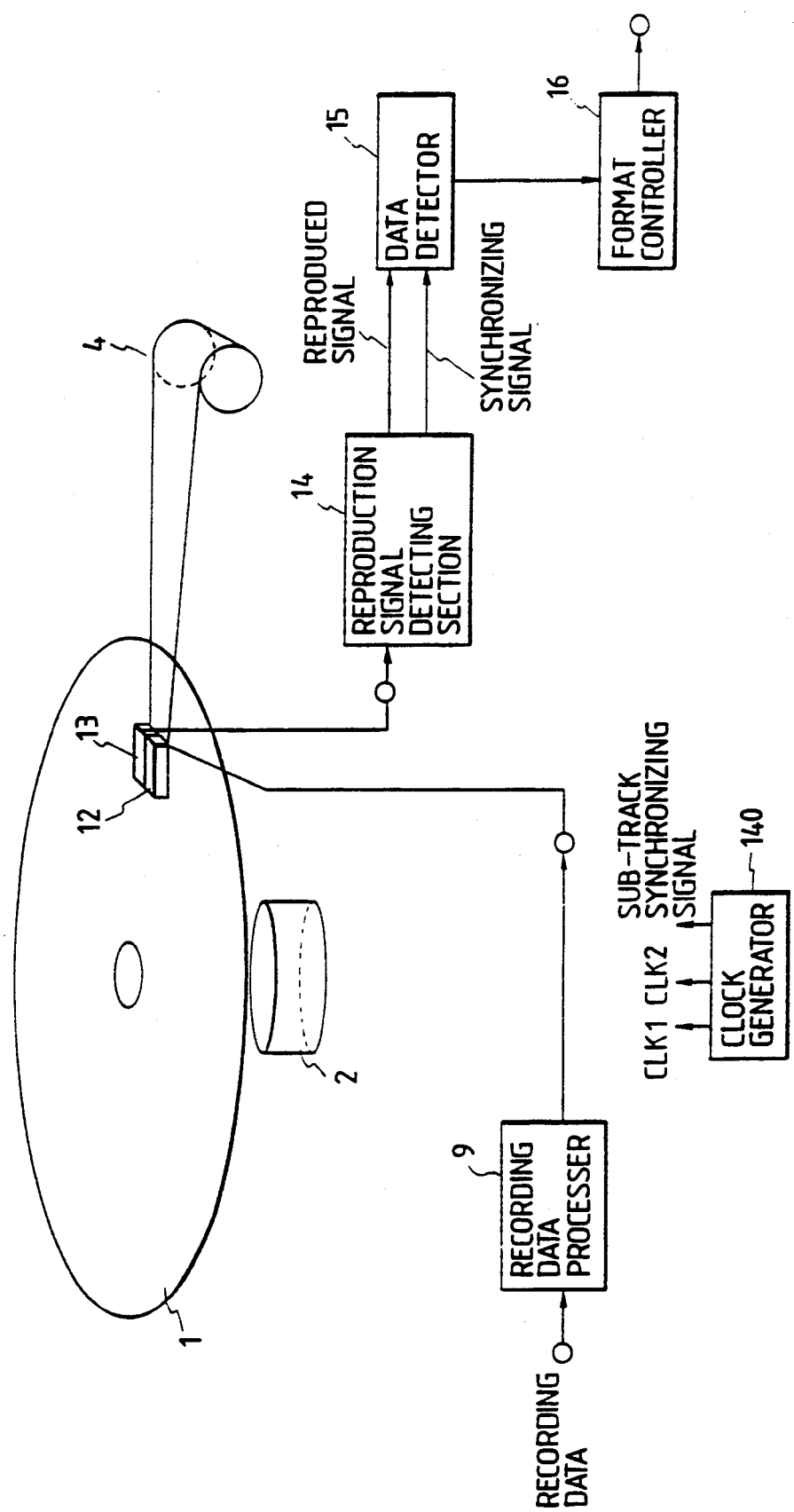
FIG. 4 is a block diagram showing an arrangement of a signal recording/reproducing apparatus according to a first embodiment of the present invention.
Figure 8:
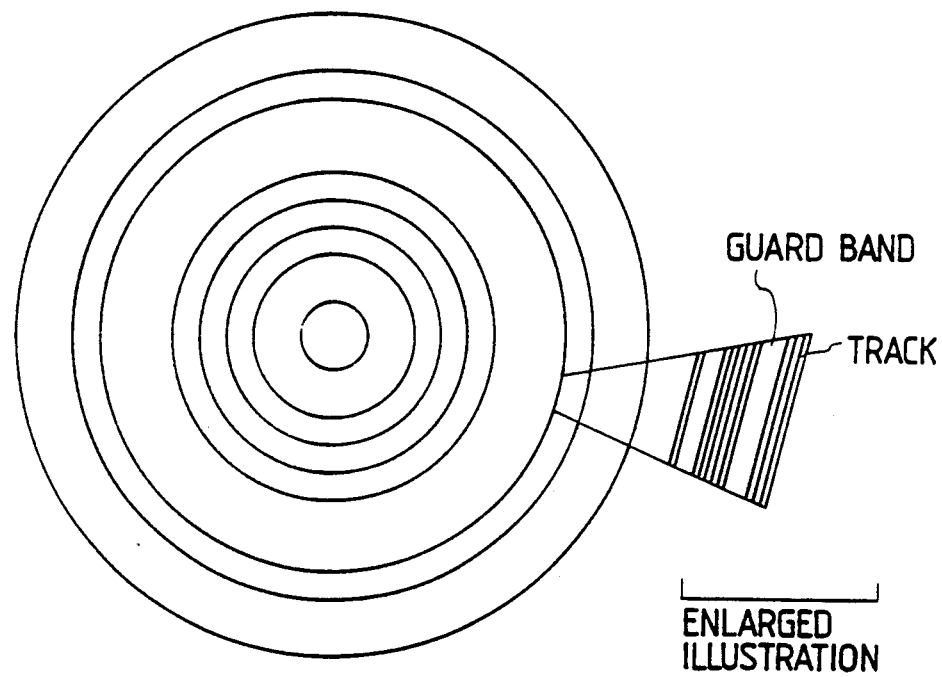
FIGS. 8 and 9 are illustrations of a recording format to be employed for the embodiments.

Referring now to FIG. 4, there is schematically illustrated a signal recording/reproducing apparatus according to a first embodiment of the present invention. In FIG. 4, after ECC-processed, parallel recording data are supplied to recording-data processor 9 to perform a modulation such as RLLC(2,7) with respect to the parallel data, before inserting control data thereinto and time-division-multiplexing it so as to produce serial data. The produced serial data are fed to a recording head section 12 to be recorded on a recording medium illustrated at nemeral 1. Here, the recording head section 12 comprises recording sub-heads whose number is N (=5, for example), thereby forming, in accordance with the serial data, concentrically annular data-recorded tracks (recording format) each comprising N sub-tracks as illustrated in FIG. 8 where there are no guard bands between the sub-tracks but there are guard bands between the recorded tracks. The recording head section 12 is driven by means of a head drive section 4. On the other hand, the recorded data signal is reproduced by means of a reproducing head section 13 comprising reproducing sub-heads whose number is M (>N) (=7, for example). The reproducing head section 13 is also driven by means of the head drive section 4. The reproduced data signal is supplied to a reproduction signal detecting section 14 so as to be processed for removal of cross-talk between the adjacent tracks, and further supplied to a data detector 15 to detect the data signal. The detected data signal is fed to a format controller 16 for demodulation such as RLLC(2,7) so as to obtain the original recording data which are in turn ECC-processed in an external circuit, for example.

Figure 9:
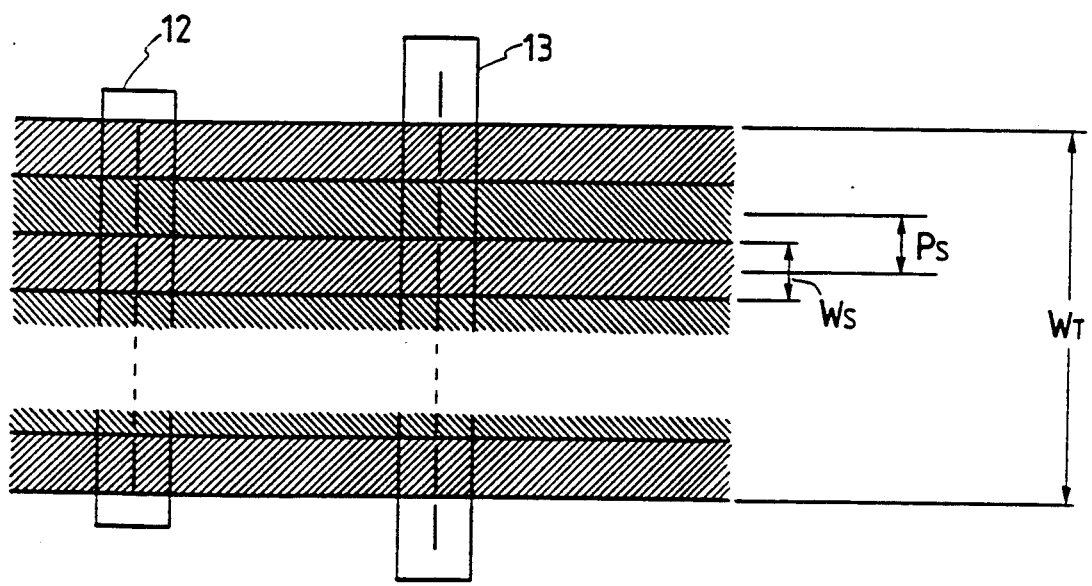

During reproducing, the relation in position between the reproducing head section 13 and the recording head section 12 on the recording medium 1 is arranged as illustrated in FIG. 9 so that N sub-tracks due to the recording head section 12 are traced by the reproducing head section 13 having the M reproducing sub-heads. In this case, although the outputs of the respective reproducing sub-heads thereof can be obtained in correspondance with the recording sub-tracks on the recording medium 1, since the trackings of the respective reproducing sub-heads with respect to the recording sub-tracks are not accurate, each of the respective reproducing sub-heads tends to trace the adjacent two recording sub-tracks. Thus, the reproduction signal detecting section 14 eliminates the ISI between the adjacent codes and the crosstalk between the adjacent sub-tracks from the M reproduced signals so as to derive accurate reproduced signals. A control signal is recorded as a reference signal to remove the crosstalk between the adjacent sub-tracks. In FIG. 9, character WT represents the track width, WS designates the sub-track width and PS depicts the sub-track pitch.

Figure 10:
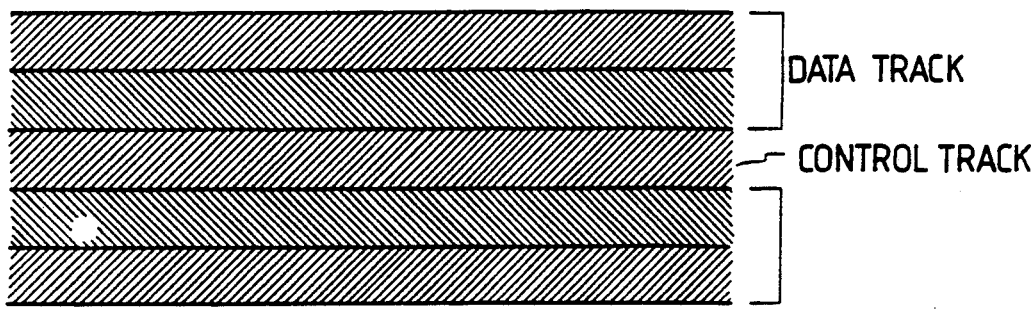
FIGS. 10 to 12 are illustrations of recording formats to be employed for the embodiments.
Figure 11:
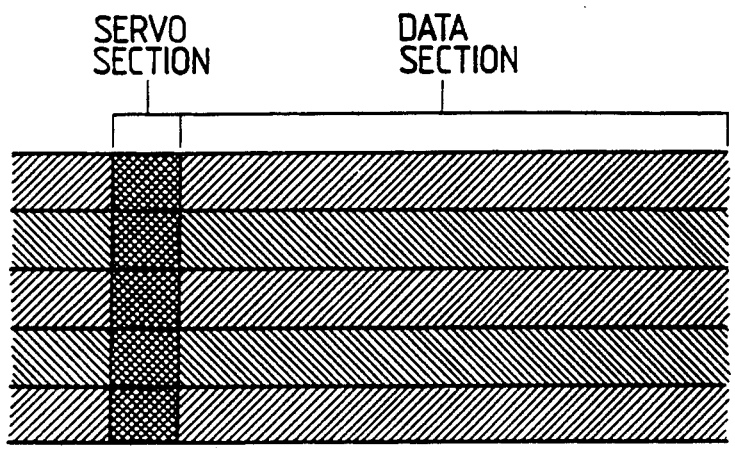
Figure 12:
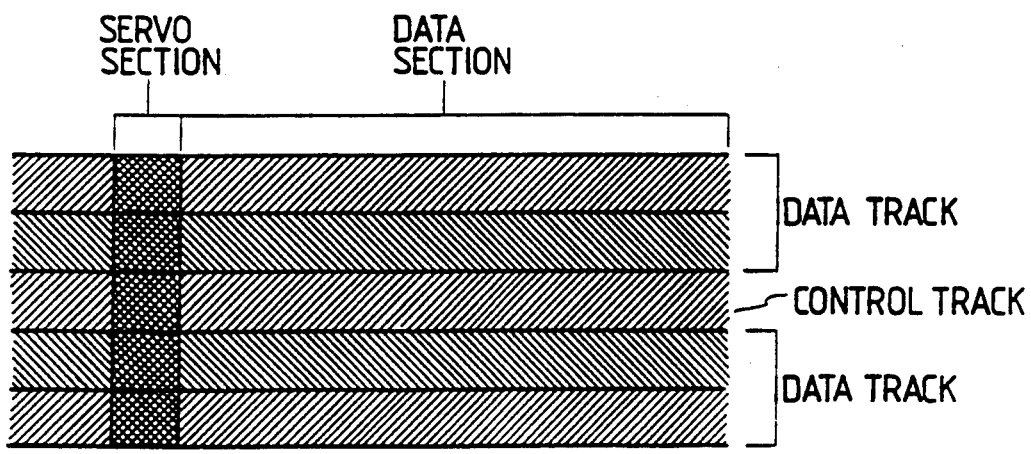

FIGS. 10 to 12 show examples of the recording formats, where the control signal which is a single frequency signal is recorded as a portion of the recording data. In FIG. 10, a single-frequency control signal is recorded so as to form one (control track) of the N sub-tracks. For example, when N=5, it is recorded as the third sub-track. In FIG. 11, one servo portion including a single-frequency signal is provided in one sector so as to synchronize with the rotation of the recording medium 1. When N=5, the following signals are recorded in the respective servo portions.

| | |
|---|---|
| 1 0 1 0 1 0 1 0 1 0 1 0 | first sub-track |
| 0 1 0 1 0 1 0 1 0 1 0 1 | second sub-track |
| 1 0 1 0 1 0 1 0 1 0 1 0 | third sub-track |
| 0 1 0 1 0 1 0 1 0 1 0 1 | fourth sub-track |
| 1 0 1 0 1 0 1 0 1 0 1 0 | fifth sub-track |

In FIG. 12, the recording format includes features illustrated in FIGS. 10 and 11. The following description will be made in terms of the FIG. 10 recording format.

Figure 6:
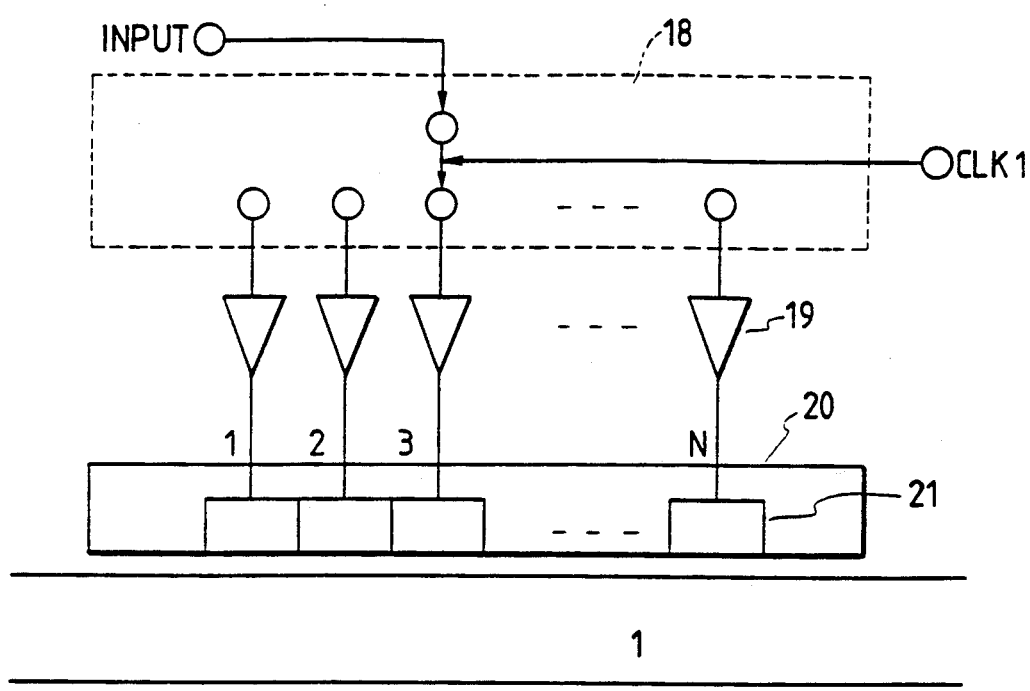
FIG. 6 is an illustration of an arrangement of a recording head section to be used in the embodiments.
Figure 7:
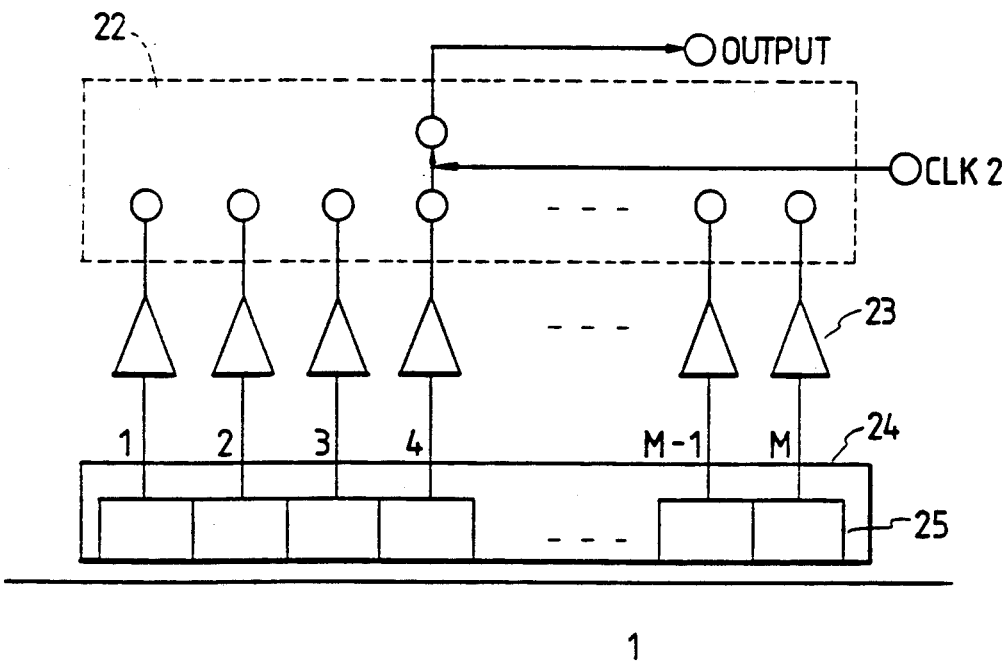
FIG. 7 shows an arrangement of a reproducing head section used in the embodiments.

The signal recording/reproducing apparatus of the first embodiment will further be described hereinbelow with reference to FIGS. 6 and 7 showing an arrangement of the recording head section 12 and an arrangement of the reproducing head section 13. As illustrated in FIG. 6, the recording head section 12 comprises a demultiplexer 18, recording sub-amplifiers 19 and a recording head 20 having recording sub-heads 21 whose number is N, and as shown in FIG. 7, the reproducing head section 13 includes a multiplexer (analog switching means) 22, reproducing sub-amplifiers 23 and a reproducing head 24 comprising reproducing sub-heads 25 whose number is M and each of which has the same pitch as the recording sub-head 21.

In FIG. 6, the demultiplexer 18 divides an inputted time-division-multiplexed serial signal into a plurality of signals, each of which is in turn inputted to the corresponding recording sub-amplifier 19. The recording head 20 is responsive to the outputs of the recording sub-amplifiers 19 so as to supply currents to the recording sub-heads 21 in correspondance with the recording tracks. Here, if the demultiplexer 18, the recording sub-amplifiers 19 and the recording head 20 are encase together in a single case, since the input recording data are expressed as one time-division multiplexed signal, the number of the signal lines can be reduced.

Figure 13:
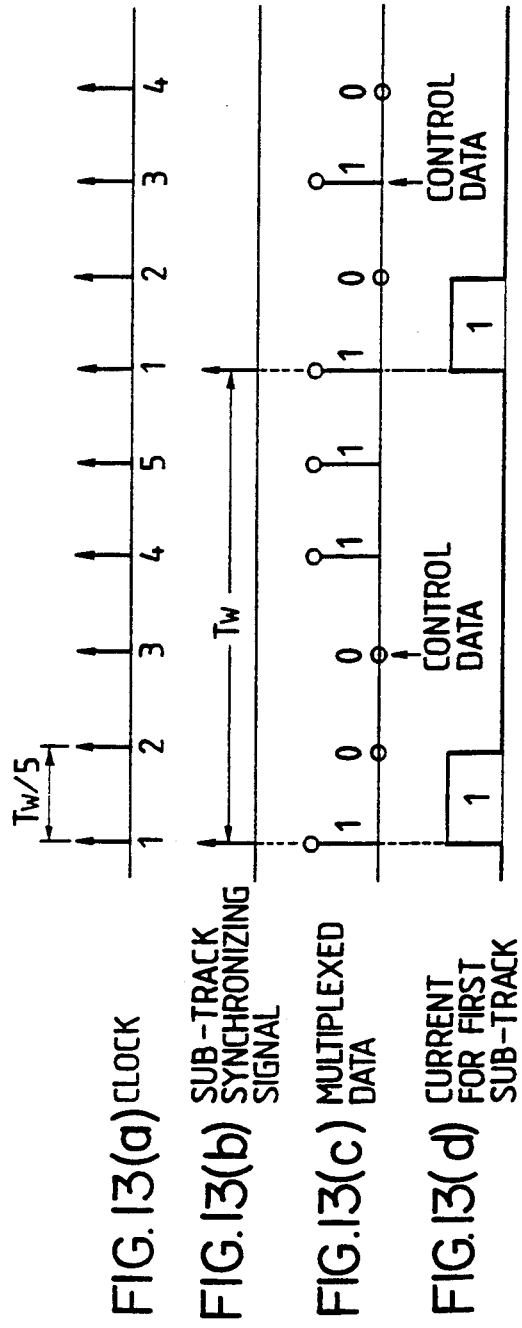
FIGS. 13a to 13h are a timing illustration for understanding of the recording operation of the recording head section in the embodiments.

FIG. 13 is an illustration describing the recording operation of the FIG. 6 recording head section 12. In FIG. 13, (b) represents a sub-track synchronizing signal to be generated with a period (cycle) coincident with a period Tw of the channel bit rate in the modulation system for modulating the original signal to be recorded, the track-recording is performed with this period. (a) of FIG. 13 designates processing clocks CLK1 for the serial data time-division-multiplexed by the above-mentioned recording data processer 9 and for using the serial data as recording data for forming the respective sub-tracks in the demultiplexer 18. In the case of RLLC(2,7), the clock-generation period becomes Tw/N obtained by dividing the period Tw of the RLLC(2,7) channel bit rate by the number N of the sub-tracks. Here, since N=5, the period results in being Tw/5 (c) of FIG. 13 shows the data to be inputted to the demultiplexer 18, where the control signal is always inserted therein as the third data by means of the recording data processer 9. For recording signals to form the sub-tracks, the sub-heads 21 respectively supply recording currents as illustrated in (d) to (h) in FIG. 13.

Returning back to FIG. 7, the outputs of the respective reproducing sub-heads 25 are respectively supplied to the reproducing sub-amplifiers 23 to be reproduction-amplified. The reproducing sub-amplifiers 23 are respectively coupled to the multiplexer 22 which is enabled in response to a processing clock CLK2 (d in FIG. 16) so as to time-division-multiplex the outputs of the reproducing sub-amplifiers 23.

Figure 16:
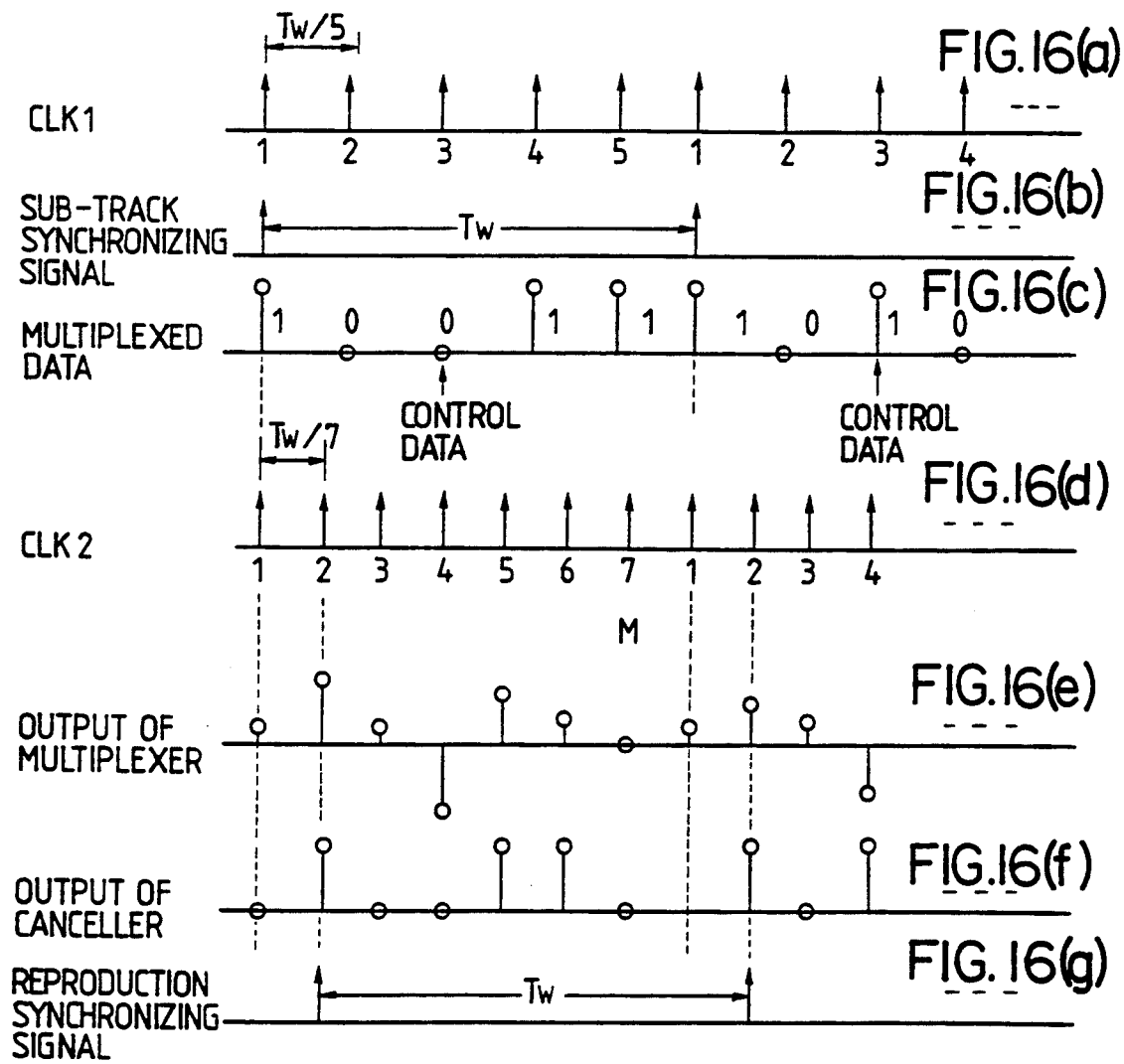
FIGS. 16a to 16g area timing illustration for understanding of the reproducing operation of the reproducing head section.

FIG. 16 is an illustration for describing the reproducing operation. In FIG. 16, as illustrated in (b), a sub-track synchronizing signal is produced with the period Tw of the channel bit rate of the recording signal as well as recording. The processing clock CLK 2 is produced with a period Tw/M as illustrated in (d) of FIG. 16 because of being required that the signals corresponding to the M sub-tracks are processed within the sub-track synchronizing signal generation period. When M=7, the period becomes Tw/7. (e) of FIG. 16 represents the output signal of the multiplexer 22. Here, as well as the recording data, the reproduction data are treated as a time-division-multiplexed signal.

Figure 14:
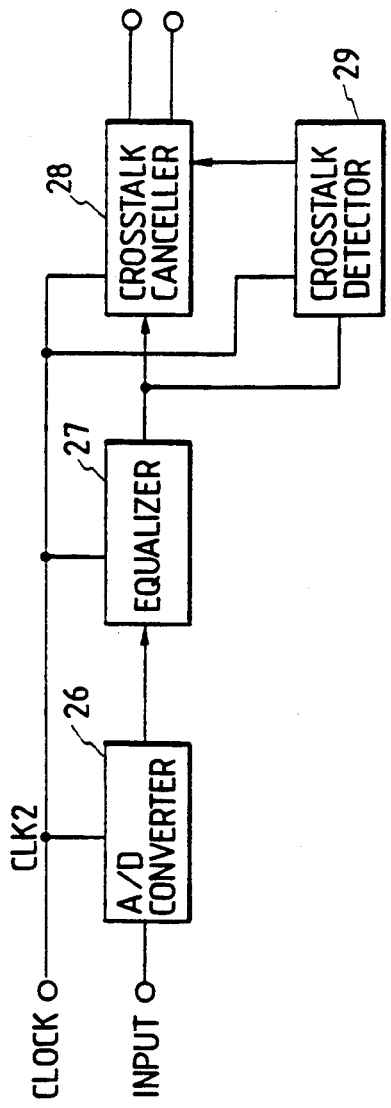
FIGS. 14 and 15 are block diagrams showing arrangement examples of a reproduction signal detecting section in the embodiments.

A description will be made hereinbelow in terms of an arrangement of the reproduction signal detecting section 14 for processing the output signal of the reproducing head section 13. In FIG. 14, the reproduction signal detecting section 14 includes an analog-to-digital converter (which will be referred hereinafter to as A/D converter) 26, an equalizer 27, a crosstalk canceller 28 and a crosstalk detector 29. The A/D converter 26 samples the time-division-multiplexed signal in response to processing clocks CLK2 and then quantizes the sampled signal. The quantizing bit number of the A/D converter 26 is about 8 bits for realization of the after-processing. The equalizer 27 eliminates the ISI between the adjacent codes from the output of the A/D converter 26. The crosstalk detector 29 detects the crosstalk component of the output signal of the equalizer 27 in accordance with the control signal. Further, the crosstalk canceller 28 eliminates the crosstalk from the output signal of the equalizer 27 on the basis of the crosstalk amount detected by the crosstalk detector 29, thereby obtaining a reproduced signal without the ISI between the adjacent codes and the crosstalk between the adjacent tracks as illustrated in (f) of FIG. 16.

Figure 17:
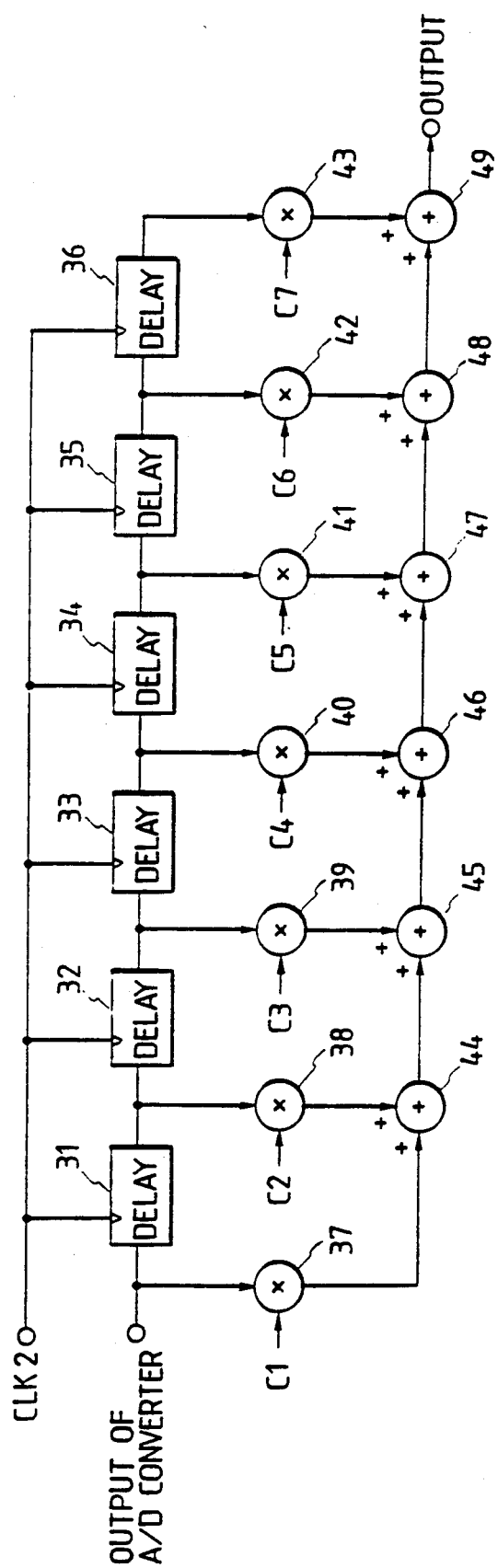
FIG. 17 is a circuit diagram showing an arrangement of an equalizer in a reproduction signal detecting section in the embodiments.
Figure 20:
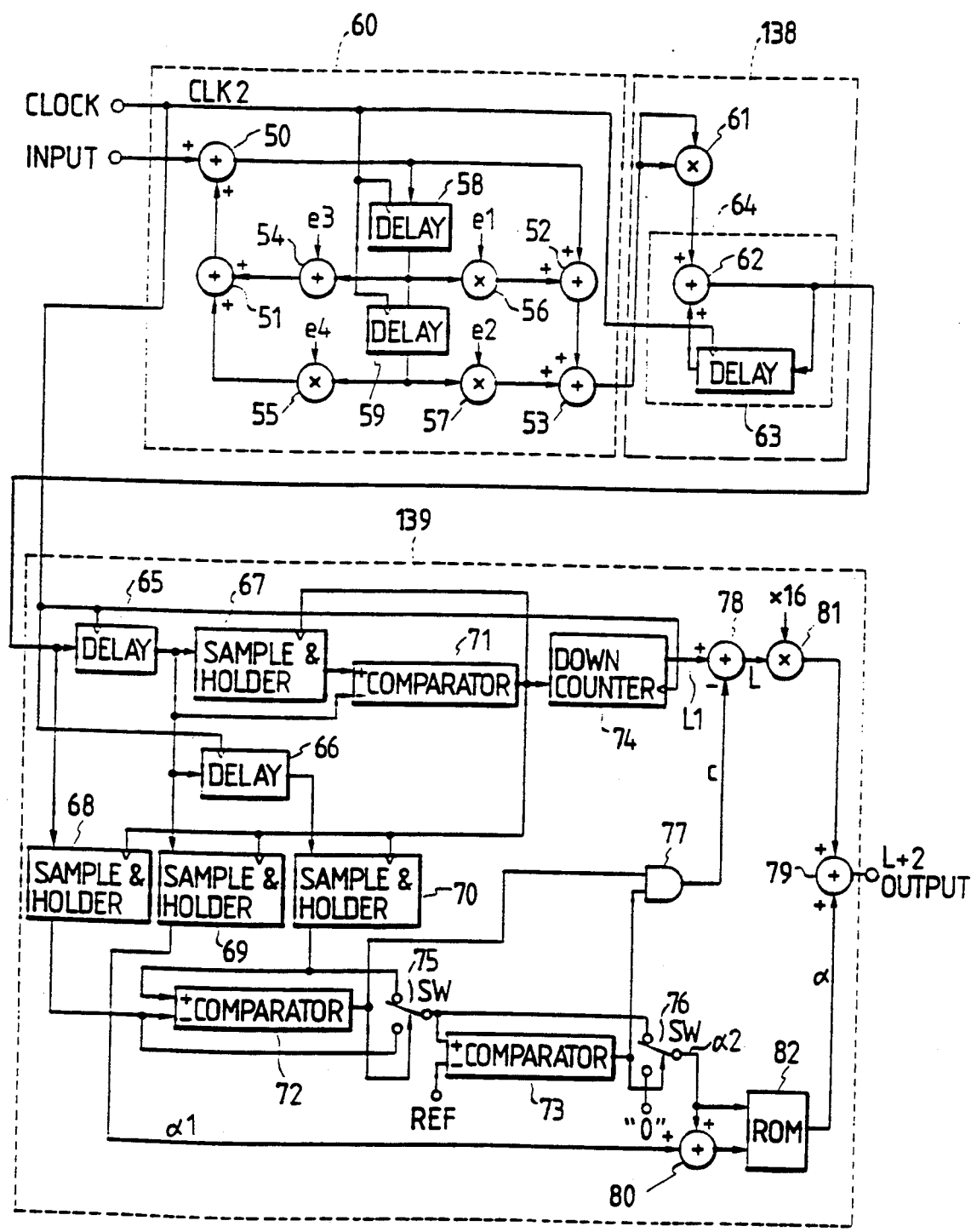
FIG. 20 is a block diagram showing an arrangement of a crosstalk detector of a reproduction signal detecting section in the embodiments.
Figure 22:
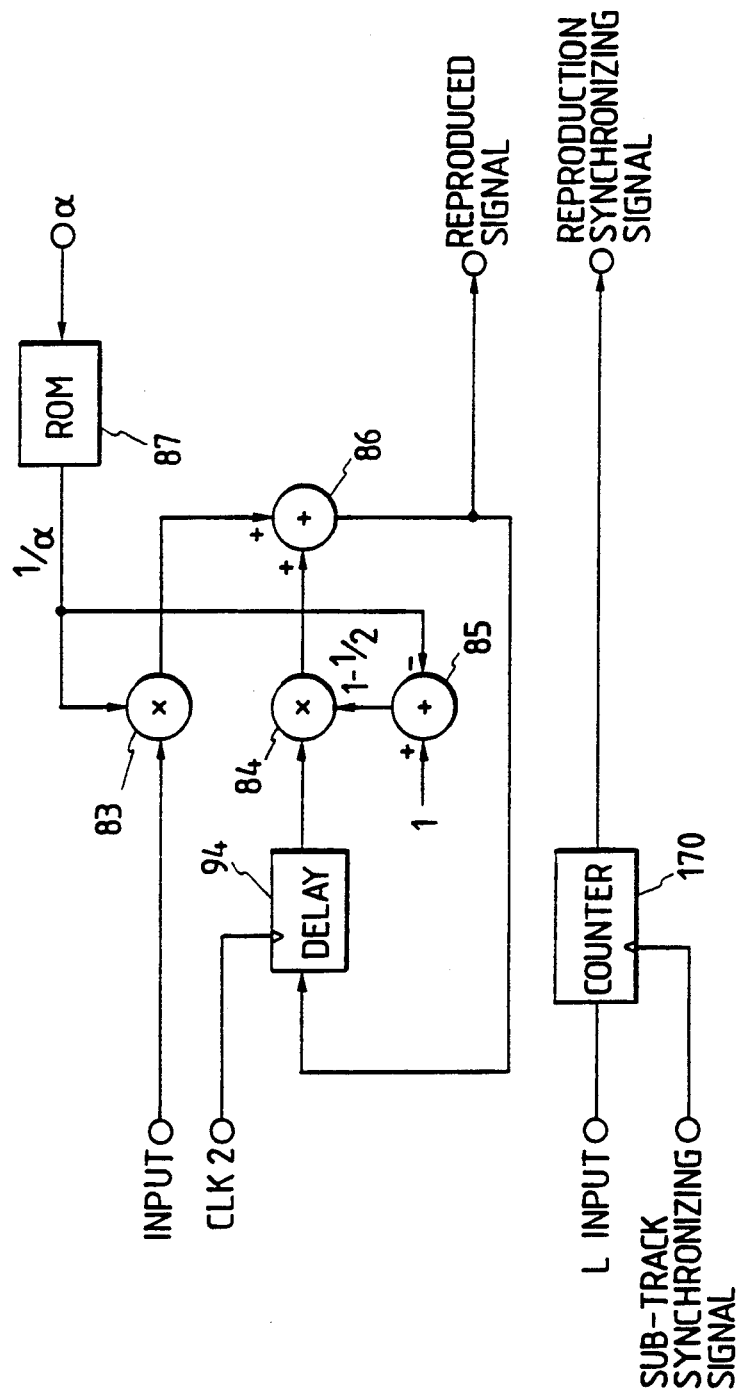
FIG. 22 is a block diagram showing an arrangement of a crosstalk canceller of the reproduction signal detecting section in the embodiments.

A description of the FIG. 14 reproduction signal detecting section 14 will hereinbelow be made in detail with reference to FIGS. 17, 20 and 22, FIG. 17 showing a circuit arrangement of the equalizer 27, FIG. 20 showing a circuit arrangement of the crosstalk detector 29 and FIG. 22 illustrating a circuit arrangement of the crosstalk canceller 28.

In FIG. 17, numerals 31 to 36 respectively represent delays, numerals 37 to 43 respectively designate multipliers and numerals 44 to 49 respectively depict adders. In FIG. 20, numerals 50 to 53 represent adders, numerals 54 to 57 are multipliers, and numerals 58 and 59 depict delays, and e1 to e4 denote the coefficient of multipliers 54 to 57, respectively. Illustrated at numeral 60 is a band pass filter (which will be referred hereinafter to as BPF) which comprises the adders 50 to 53, the multipliers 54 to 57 and the delays 58, 59. Numeral 62 represents an adder and numeral 63 designates a delay. Illustrated at numeral 64 is a low pass filter (which will hereinafter be referred to as LPF) which is composed of the adder 62 and the delay 63. Numeral 61 denotes a multiplier and numeral 138 is a level detector comprising the multiplier 61 and the LPF 64. Numerals 65 and 66 depict delays, numerals 67 to 70 designate sampling and holding circuits, numerals 71 to 73 represent comparators, numeral 74 is a down counter, numerals 75 and 76 are switches, numeral 77 depicts a two-input AND circuit, numerals 78 to 80 are adders, numeral 81 depicts a multiplier, and numeral 82 is a ROM (read-only memory). Illustrated at numeral 139 is an off-tracking calculation circuit, which computes an off-tracking amount (shift) as $\Delta$(delta), comprising the delays 65, 66, the sampling and holding circuits 67 to 70, the comparators 71 to 73, the down counter 74, switches 75, 67, the two-input AND circuit 77, the adders 78 to 80, the multiplier 81 and the ROM 82.

In FIG. 22, numeral 94 represents a delay, numerals 83 and 84 designate multipliers, numeral 85 is a subtracter, numeral 86 depicts an adder, numeral 87 denotes a ROM, and numeral 170 is a counter.

Now, assuming ideal conditions wherein there are no guard bands between the respective sub-tracks formed on the recording medium and the widths of the respective sub-tracks are equal to each other, the width of each of the respective sub-tracks is equal to that of the sub-head of the reproducing head and there are no guard spaces between the respective sub-heads in the reproducing head, if the nth sub-track reproduction signal obtained when the reproducing head accurately traces the recording sub-tracks on the recording medium is Rn(t), the relation between the reproducing head output Qm(t) and the reproduction signal Rn(t) can be expressed in accordance with the following equation.

$$R(t) = \{R1(t), R2(t), \ldots R_N(t)\}^T$$

$$Q(t) = \{Q1(t), Q2(t), \ldots Q_M(t)\}^T$$

$$Q(t) = A \cdot R(t) \tag{1}$$

$$A = \begin{bmatrix} 0 & 0 & 0 & 0 & \cdot & \cdot \\ \cdot & \cdot & & & & \\ 0 & 0 & 0 & 0 & \cdot & \cdot \\ \alpha & 0 & 0 & 0 & & \\ (1-\alpha) & \alpha & 0 & 0 & & \\ 0 & (1-\alpha) & \alpha & & & \\ \cdot & & & \cdot & & \\ \cdot & & & & \cdot & \\ 0 & 0 & (1-\alpha) & \alpha & & \\ 0 & 0 & 0 & (1-\alpha) & & \\ \cdot & & & & & \\ 0 & 0 & 0 & 0 & \cdot & \cdot \end{bmatrix}$$

where $\{\ \}^T$ represents a row vector and A depicts a N×M matrix.

Figure 18:
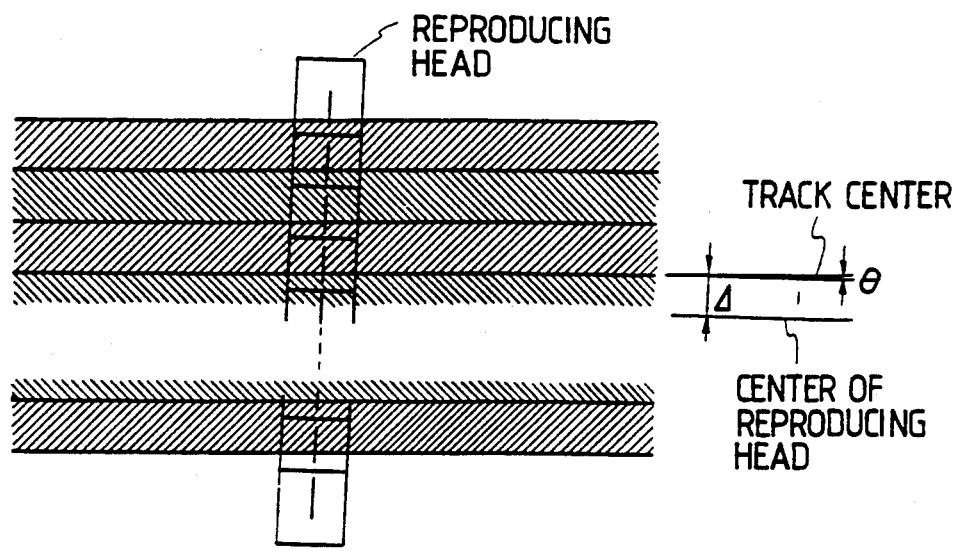
FIG. 18 is a graphic illustration of a reproducing head section with respect to recording sub-tracks.
Figure 19:
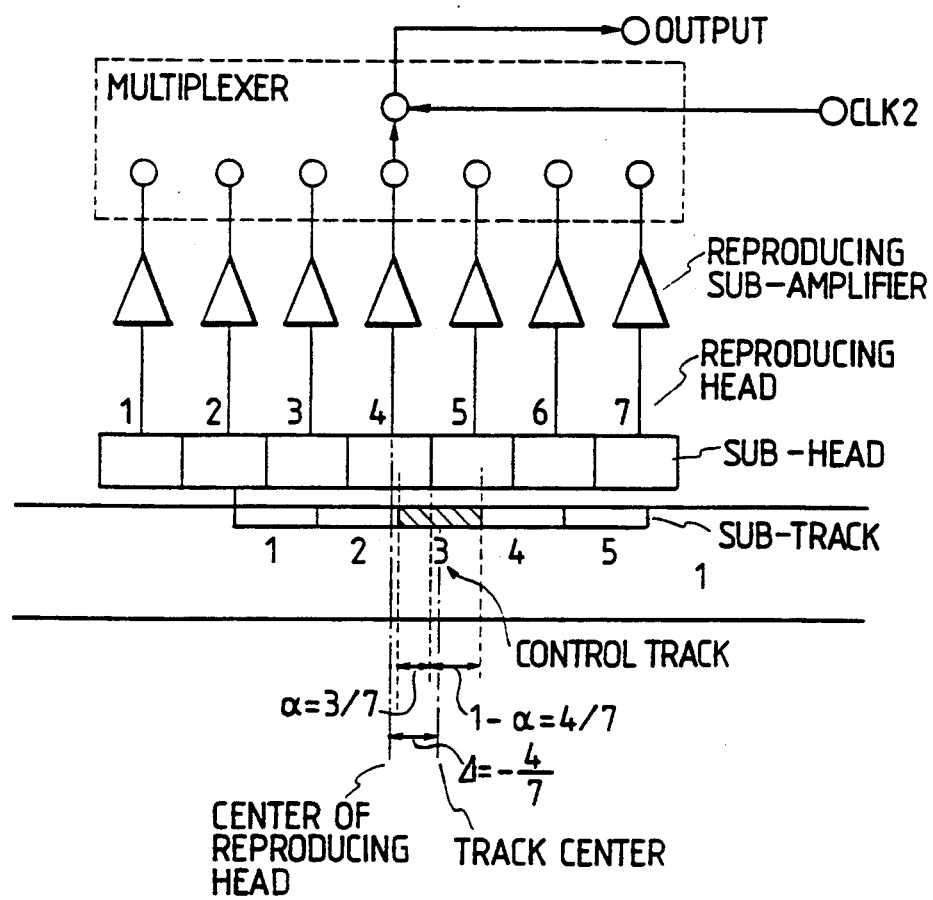
FIG. 19 is an illustration for describing the position relation between recording sub-tracks and a reproducing head section.

In the equation (1), let it be assumed that the locus of the reproducing head section 13 is shifted by $\Delta$ with respect to the recording track at the track pitch interval as illustrated in FIG. 18. In this case, a description of the shift $\Delta$ will be made hereinbelow with reference to FIG. 19 showing the relation in position between the recording sub-track and the reproducing subheads 25. The shift $\Delta$ is normalized by the sub-track pitch so that its integer part and decimal part represent the number of off-sub-tracks and the overlapping ratio of each reproducing sub-head and each formed recording sub-track. In FIG. 19, when the shift $\Delta$ between the recording sub-tracks and the reproducing sub-heads 25 is as illustrated and, of the shift $\Delta$, the integer part is a and the decimal part thereof is $\alpha$, the reproduced signal Qm(t) due to the mth reproducing sub-head becomes as follows.

$$Qm(t) = \alpha \cdot Rn(t) + (1-\alpha) \cdot Rn - 1(t) \tag{2}$$

where $\alpha = \Delta - a$, $0 \leq \alpha < 1$, $a = m - 1$, and Ri(t)=0 when $i \leq 0$ or $i > N$.

That is, since the mth reproducing sub-head traces both the nth sub-track and n+1th sub-track, the mth reproducing sub-head outputs a reproduced signal comprising the nth sub-track signal component and the n+1th sub-track signal component in the ratio of $\alpha$:(1−$\alpha$).

Here, it is required to consider that the shift $\Delta$ varies in accordance with time because the tracking condition of the reproducing head section 13 with respect to the recording track varies. In the case of no control of the head drive section 4, the tracking error amount of the reproducing head section 13 with respect to the recording track varies by about 20 microns which is a maximum amount. When being placed at the position of radius 25 mm on the recording medium 1, the maximum variation of the shift $\Delta$ is given by an inclination $\theta$ as illustrated in FIG. 18 and becomes 0.0004 bit per one bit in conversion into the recording data bit length on the recording medium 1.

A description of the equalizer 27 will be made hereinbelow in terms of the variation of the shift $\Delta$ with reference to FIG. 17. In FIG. 17, the equalizer 27 is constructed as a 7-tap transversal filter which is composed of the delays 31 to 36, the multipliers 37 to 43 and the adders 44 to 49 as described above. The delays 31 to 36 output 7-clock delayed versions of the input signals. Because the reprodicing sub-track number M is 7, in the output of the A/D converter 26, the output signal of the same reproducing sub-head can be obtained at every 7 clocks. Thus, in each of the outputs of the delays 31 to 36, a signal obtained by sampling and quantizing the output of the same reproducing sub-head appears at every tap. The output signal of the A/D converter 26 is an 8-bit parallel signal and hence each of the delays 31 to 36 has an 8-bit parallel arrangement. The multipliers 37 to 43 respectively multiply the respective tap outputs by coefficients C1 to C7, and the adders 44 to 49 perform the addition of the outputs of the multipliers 37 to 43. The characterisitc of the equalizer 27 depends upon the coefficients C1 to C7 of the multipliers 37 to 43 and is determined so as to reduce the interference between the adjacent codes. Since the equalizer 27 is arranged to be 7 taps, the variation of the shift $\Delta$ corresponds to 0.0004×0.7=0.00028 bits which can sufficiently be disregarded because the quantizing bit number of the A/D converter 26 and equalizer 27 is 8 bits. Thus, the shift $\Delta$ showing the positional relation between the reproducing head section 13 and the recording sub-track can be considered as being constant with respect to time, that is, $\alpha$ in the above-mentioned equation (2)

becomes constant. Here, the output Em(t) of the output of the equalizer 25 is as follows.

$$Em(t) = \sum_{k=1}^{7} Ck \cdot Qm(t - (k \cdot Tw/M)) \quad (3)$$

Thus, from the equation (2), $$Em(t) = \sum_{k=1}^{7} Ck \cdot (\alpha \cdot Rn - a(t) - (1 - \alpha) \cdot Rn - a - 1(t) \quad (4)$$

$$Em(t) = \alpha \cdot \sum_{k=1}^{7} Ck \cdot Rn - a(t) - (1 - \alpha) \cdot$$

$$\sum_{k=1}^{7} Ck \cdot Rn - a - 1(t)$$

Accordingly, in the case that all the outputs of the reproducing sub-heads are equalized with the same characteristic, there is no problem in terms of equalizing the reproduction signals from the respective recording sub-tracks on the recording medium 1.

Operation of the crosstalk detector 29 will be described hereinbelow with reference to FIGS. 19 to 21. Here, as illustrated in FIG. 19, the number N of the recording sub-tracks 21 is 5, the number M of the reproducing sub-heads 25 is 7 and the control track of the recording sub-tracks is reproduced in a ratio of $\alpha = 3/7$ by means of the fourth reproducing sub-head 25 and is also reproduced in a ratio of $1-\alpha = 4/7$ by means of the fifth reproducing sub-head 25 when $\Delta = -4/7$.

Further, as illustrated in FIG. 19, the shift amount $\Delta$ of the reproducing head section 13 with respect to the recording track is calculated in terms of the control track, and therefore the relative position relation between the control track and the reproducing sub-head 25 is calculated. The shift $\Delta$ can be given in accordance with the following equation.

$$\Delta = 3 - L + \alpha \quad (5)$$

where
L : the smaller number of the two reproducing sub-heads which reproduce the control track,
$\alpha$ = reproduction ratio of the control track by the reproducing sub-head, $0 \leq \alpha < 1$.

The crosstalk detector 29 detects the control data by the BPF 60 and detects the absolute value of the control data by the level detector 138 so as to calculate the relative positional relation $\Delta$ between the recording sub-track and the reproducing head section 13 in the delta calculation circuit 139. In FIG. 21, (a) shows the processing clock CLK2 whereby the delays of the crosstalk detector 29 are operable, (b) illustrates a sub-track synchronizing signal, and (c) shows one example of the output signal of the equalizer 27. The BPF is constructed as a narrow-band pass filter which outputs signals whose frequencies are at the frequency of the control signal. Further, (d) illustrates the output waveform of the BPF 60. The multiplier 61 raises its input signal to the second power. Still further, (e) illustrates the output signal of the multiplier 61 where the signal of the BPF 60 is converted to a signal having only positive sign. The LPF 64 low-frequency-filters the signal of the multiplier 61 so as to reduce the residual noise component, the output thereof being illustrated in (f), in which the output signals of the LPF 64 are indicated at d1 to d7. When, of the relative position relation $\Delta$ between the recording sub-track and the reproducing head section 13, the integer part of the shift is L and the decimal part is $\alpha$, $\alpha$ may be expressed with four bits and three bits are assigned for L. Thus, the shift $\alpha$ can be expressed with seven bits. When the detection is made under the conditions that the subtrack number whose level is the maximum in the output of the level detector 138, i.e., the output of the LPF 64, is L1 and the level thereof is $\alpha 1$, and at the same time when the subtrack number of the greater one of its adjacent signal levels is L2 and the level thereof is $\alpha 2$, the delta calculation circuit 139 may perform the following calculation.

The integer part shift L is expressed as follows.

$$L = \begin{cases} L1 & \text{when } \alpha 2 \leq \text{ref or } L2 > L1 \\ L1 - 1 & \text{otherwise} \end{cases} \quad (6)$$

where ref represents a reference level greater than the residual noise voltage.

The decimal partiple shift $\alpha$ is expressed as follows.

$$\alpha = \begin{cases} \sqrt{\alpha 2} / (\sqrt{\alpha 1} + \sqrt{\alpha 2}) & \text{when } \alpha 2 >> 0 \\ 0 & \text{when } \alpha 2 \leq \text{ref} \end{cases} \quad (7)$$

The relative positional relation $\Delta$ between the recording sub-track and the reproducing head section 13 is expressed in accordance with the equation (5).

A circuit block comprising the delays 65, 66, the sampling and holding circuit 67, the comparator 71, the adder 78, the multiplier 81, the two-input AND circuit 77 and the adder 78 of the delta calculation circuit 139 realizes the above-mentioned equation (6). A circuit block comprising the delay 66, the sampling and holding circuits 68 to 70, the comparators 72, 73, the switches 75, 76, the adder 80 and the ROM 82 realizes the above-mentioned equation (7). Here, in the equation (7), the switching of $\alpha 2$ detecting the condition that $L2 > L1$ is performed by means of the switch 75 and the condition of $\alpha 2 \leq $ ref is set by the comparator 73. At this time, the setting of $\alpha = 0$ is effected by the switch 76. Further, a circuit block comprising the multiplier 81 which is realized with a bit-shift operation and the adder 79 outputs $L + \alpha$ to the crosstalk canceller 28.

In the case that, as illustrated in FIG. 19, the control track of the recording sub-tracks is reproduced in a ratio of $\alpha = 3/7$ by means of the fourth reproducing sub-head 25 and reproduced in a ratio of $(1 - \alpha) = 4/7$ by the fifth sub-head 25, the output of the LPF 64 is as illustrated in (f) of FIG. 21, and at this time the maximum value $\alpha 1$ of the control signal is at the time of d5 so that $L1 = 5$ and $\alpha 1 = 4/7$. Further, the next greater one $\alpha 2$ is at the time of d4, so that $L2 = 4$ and $\alpha 2 = 3/7$. At this time, the waveforms of the respective portions are as illustrated in (g) to (n). Thus, the output $L + \alpha$ of the adder 79 becomes $4 + 3/7$.

With the above-described operation, the crosstalk detector 29 calculates $L + \alpha$ which describes the shift amount $\Delta$ of the reproducing head section 13 with respect to the recording track.

Operation of the crosstalk canceller 28 will be described hereinbelow with reference to FIG. 22. In FIG. 22, when the output of the equalizer 27 is E(t) and the output of the crosstalk canceller 28 is D(t), the following calculations are effected for obtaining the output of the crosstalk canceller 28 in which the crosstalk component is removed from the output of the equalizer 27.

Let D(t) and E(t) be in detail.

$$D(t) = \{D1(t), D2(t), D3(t), \ldots, D_M(t)\}^T$$

and $$E(t) = \{E1(t), E2(t), E3(t), \ldots, E_M(t)\}^T \quad (8)$$

The signal $D_L(t)$ of the Lth sub-track is obtained by using $\alpha$ of the shift amount $\Delta$ in accordance with the following equation, $$D_L(t) = 1/\alpha \cdot E_L(t) \quad (10)$$

and the output of the mth sub-track is obtained by using the result of the equation (10) in accordance with the following equation, $$Dm(t) = 1/\alpha \cdot Em - 1(t) + (\alpha - 1)/\alpha \cdot Dm - 1(t)$$

$$L + 1 \leq m < L + N \quad (11)$$

It is possible to obtain an accurate reproduced signal with the above-mentioned calculations, and FIG. 22 shows a circuit arrangement for performing the calculations.

In FIG. 22, the ROM 87 is responsive to the lower 4 bits of the crosstalk detector 29 output $\alpha$ so as to calculate $1/\alpha$ on the basis of $\alpha$, the output $1/\alpha$ of the ROM 87 being supplied to the multiplier 83 which is coupled to the equalizer 27. The multiplier 83 multiplies the output of the equalizer 27 by the crosstalk level $1/\alpha$, the output of the multiplier 83 being supplied to the adder 86. The adder 86 adds the output of the multiplier 83 to the output of the multiplier 84, the addition result of the adder 86 being outputted as a reproduced signal and further supplied to the delay 94. The delay 94 delays the output of the adder 86 by the generation period of the processing clock CLK 2 and supplies the delay result to the multiplier 84 which is in turn responsive to the output of the subtracter 85. The subtracter 85 is coupled to the output of the ROM 87 to receive $1/\alpha$ and subtracts it from 1 so as to output $1 - 1/\alpha$, whereby the multiplier 84 multiplies the output $1 - 1/\alpha$ by the output of the delay 94. On the other hand, the counter 170 is arranged to be cleared in response to the sub-track synchronizing signal and to count the shift amount a between the recording sub-track and the reproducing head section 13 with respect to the L input so as to output a reproduction synchronizing signal.

Returning again to FIG. 16, (f) illustrates a reproduced signal crosstalk-cancelled and (g) shows a reproduction synchronizing signal which represents the head position of each of the reproduced signals. The reproduced signal and the reproduction synchronizing signal are supplied to the data detector 15 illustrated in FIG. 4.

The above-described arrangement allows to narrow the track pitch to increase the recording capacity and extremely improve the transfer rate and suppress the ISI from the adjacent codes and further reduce the reproduction data error rate due to the crosstalk.

Figure 15:
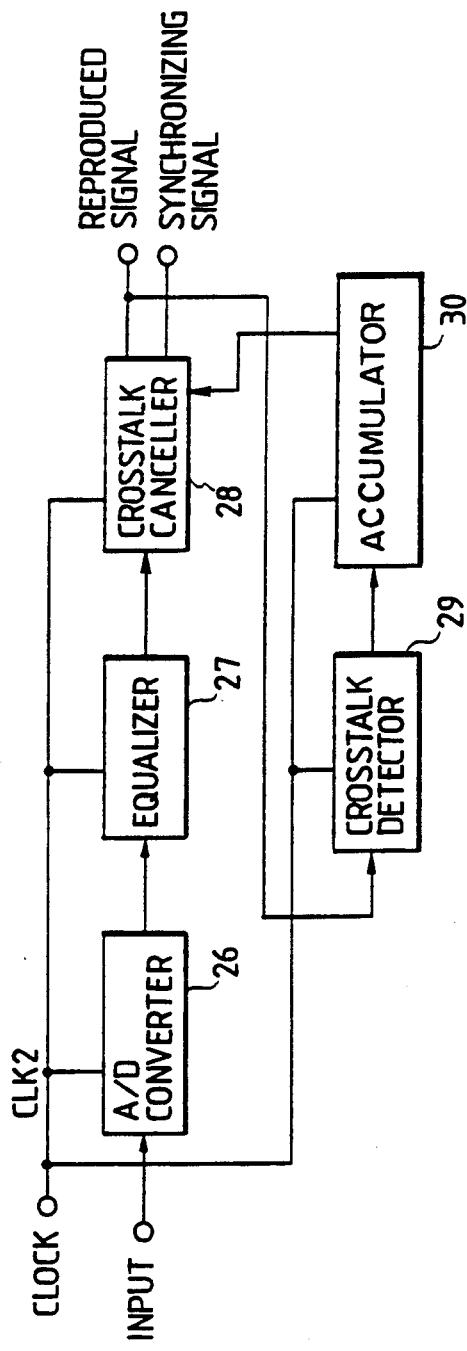

Although in the reproduction signal detecting section 14 the crosstalk level is detected on the basis of the input signal of the crosstalk canceller 28, it is also appropriate to detect it on the basis of the output signal of the crosstalk canceller 28. In this case as illustrated in FIG. 15, it is required to use an accumulator. In FIG. 15, the crosstalk detector is coupled to the output of the crosstalk canceller 28, and outputs the shift amount $\alpha$ to the accumulator 30. The accumulator 30 low-frequency-filters and accumulates $\alpha$ for controlling the crosstalk canceller 28 so as to make the shift amount close to 0. Here, it is allowed that the accumulator 30 has the circuit arrangement of the LPF 64 comprising the adder 62 and the delay 63 of the crosstalk detector 29.

With the above-described arrangement, in addition to the above-mentioned effects, it is possible to provide a signal recording/reproducing apparatus which is capable of improving the crosstalk elimination characteristic.

Figure 1:
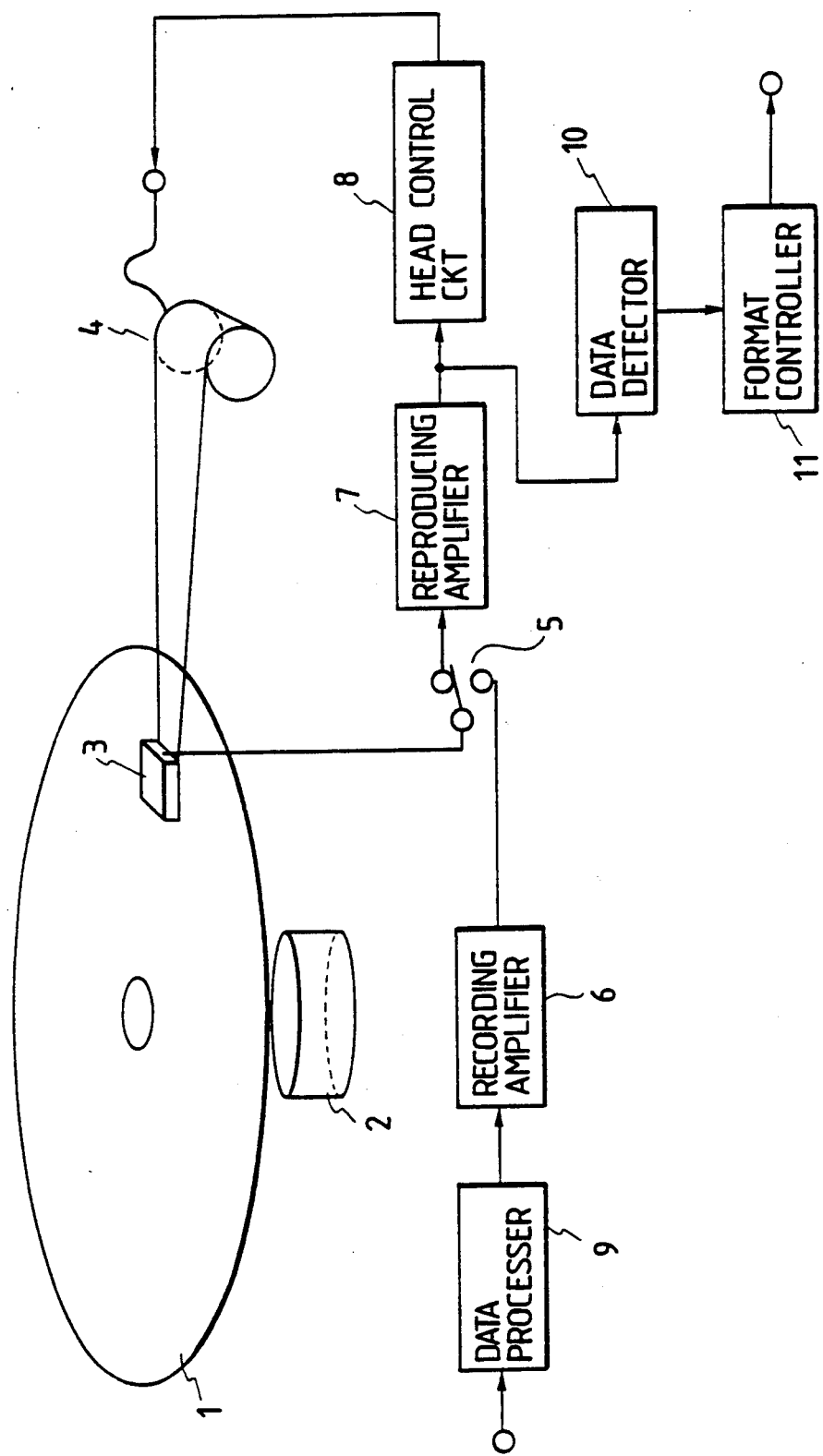
FIG. 1 is a block diagram showing an arrangement of a conventional signal recording/reproducing apparatus.
Figure 2:
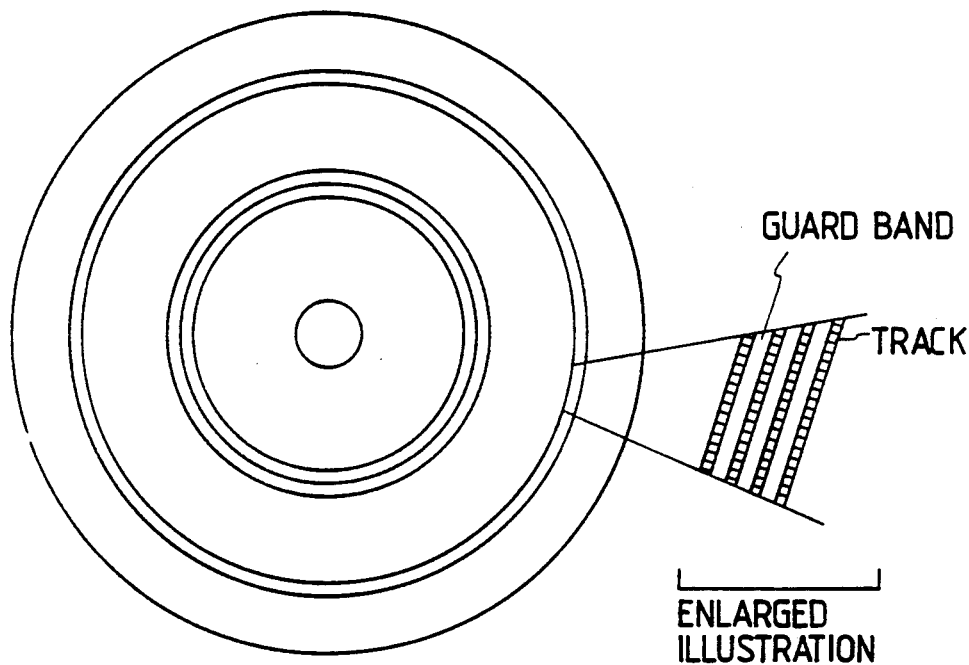
FIGS. 2 and 3 are illustrations of a recording format used in the FIG. 1 conventional signal recording/reproducing apparatus.
Figure 3:
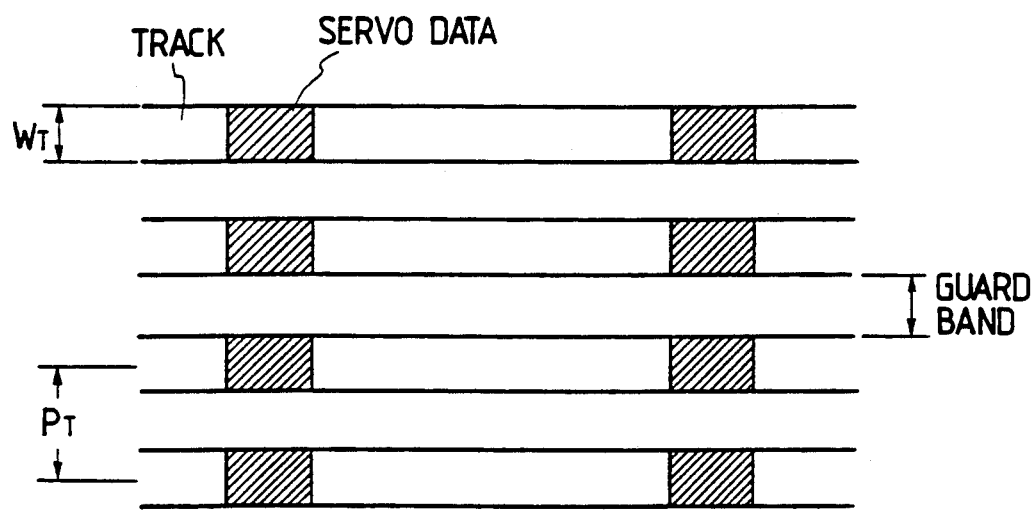
Figure 5:
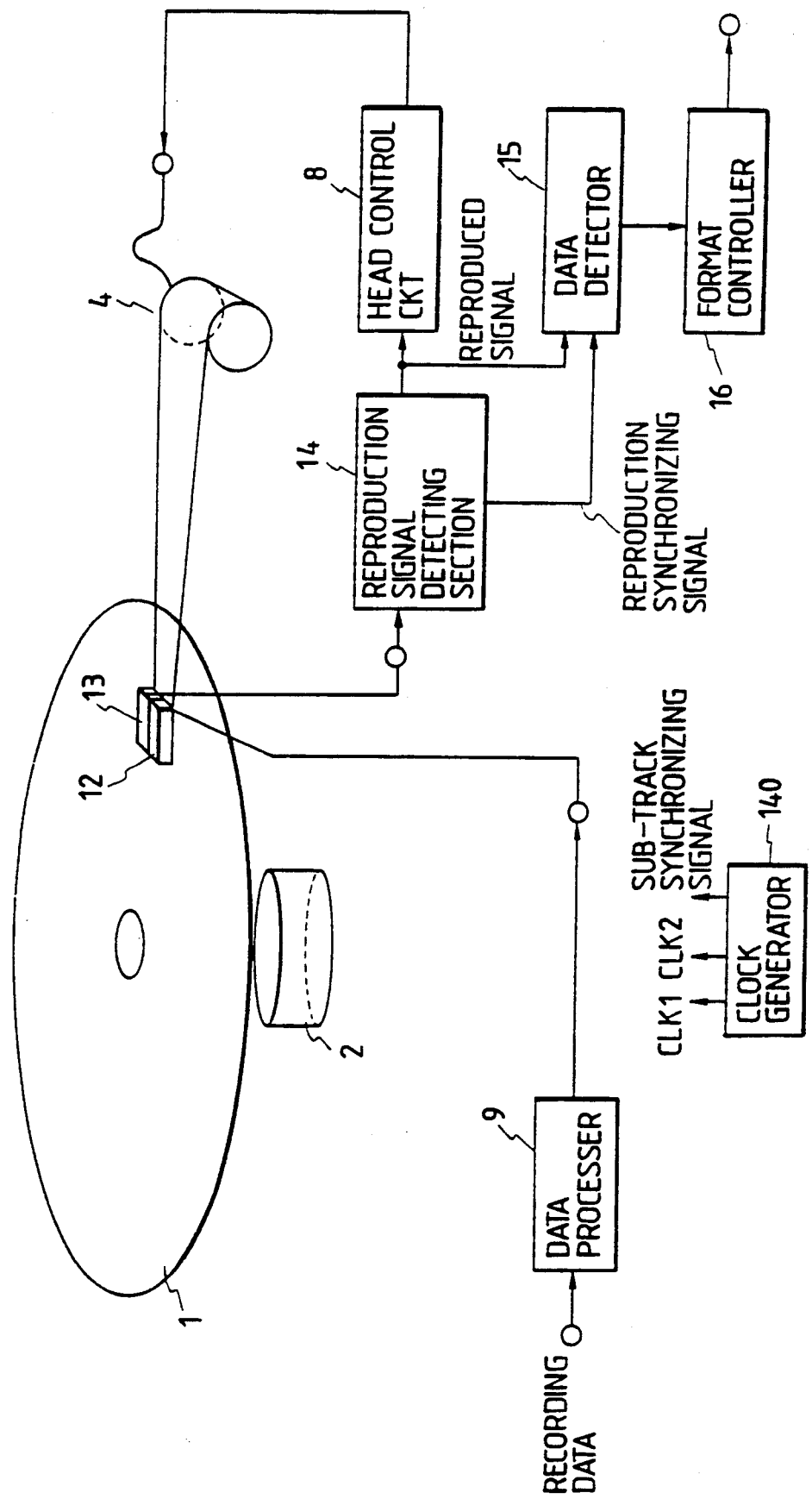
FIG. 5 is a block diagram showing an arrangement of a signal recording/reproducing apparatus according to a second embodiment of this invention.

A description will be made hereinbelow in terms of a second embodiment of this invention with reference to FIG. 5. Parts corresponding to those in FIG. 4 are marked with the same numerals and the description thereof will be omitted for brevity. In FIG. 5, one difference between the FIG. 4 first embodiment and the FIG. 5 second embodiment is that a head control circuit illustrated at numeral 8 is provided additionally whereby the tracking control is similarly effected for the recording head section 12 and the reproducing head section 13. The head control circuit 8 has the substantially same arrangement as the head control circuit described with reference to FIG. 1, and hence the description thereof will be omitted for brevity. With this arrangement, it is possible to further improve the track density which results in providing a greater recording capacity.

Although in the above-description guard bands are not presented between the recording sub-tracks, it is possible to similarly perform the operation because the width is predetermined in the recording format even if there are provided the guard bands therebetween. In the case of providing the guard spaces for the reproducing head, similar processing is also possible. However, in these cases, the respective constants in the equations (1) and (9) or the coefficients in the equations (10) and (11) are controlled in correspondance with the guard-band width. In addition, in case that there are unknown guard band widths or guard space widths, it is possible to estimate it by a system identification technique because the variation of the recording and reproducing properties is very slow in comparison with the data transfer rate.

Figure 23:
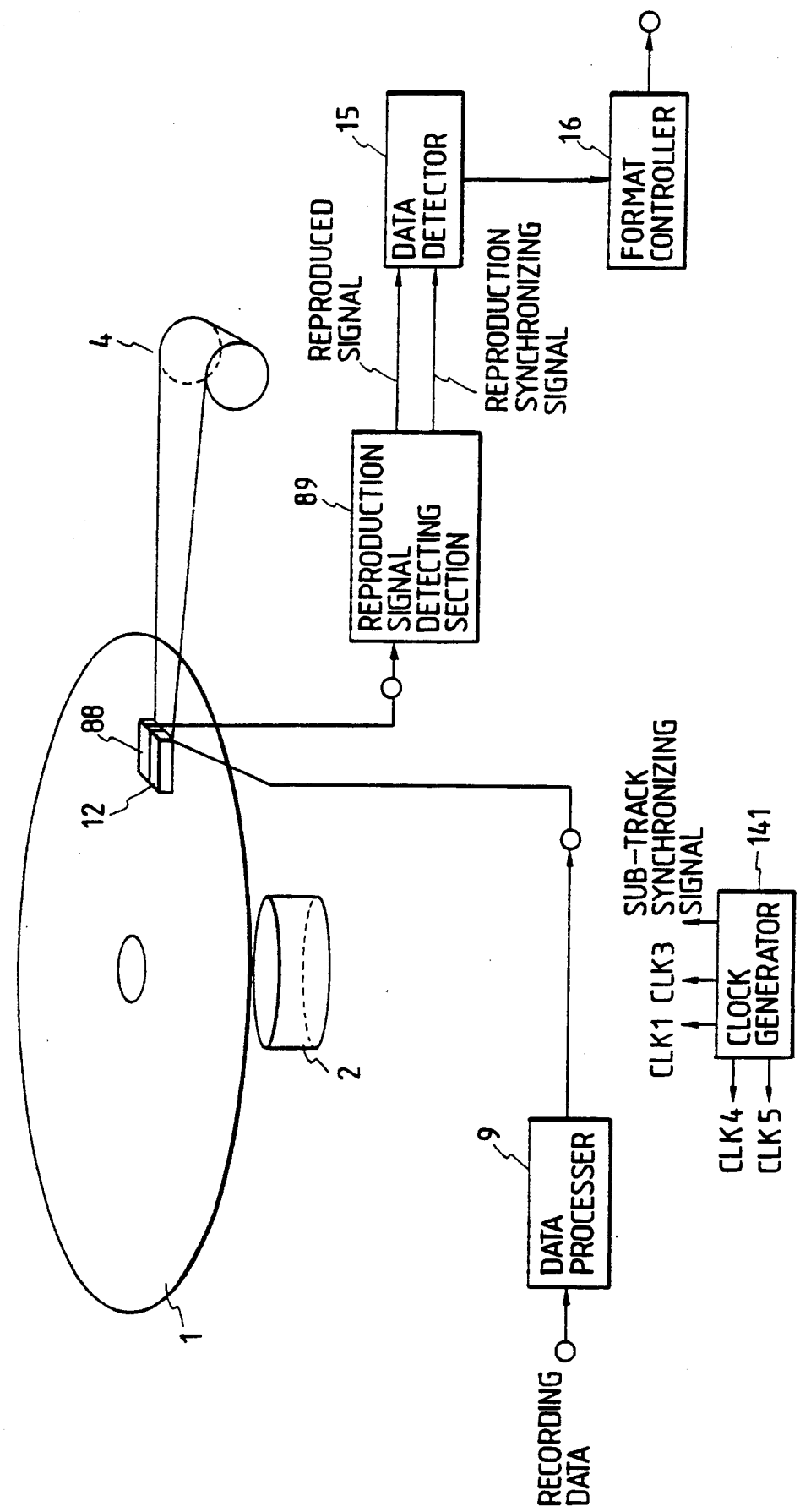
FIG. 23 is an illustration for describing a signal recording/reproducing apparatus according to a third embodiment of the present invention.
Figure 25:
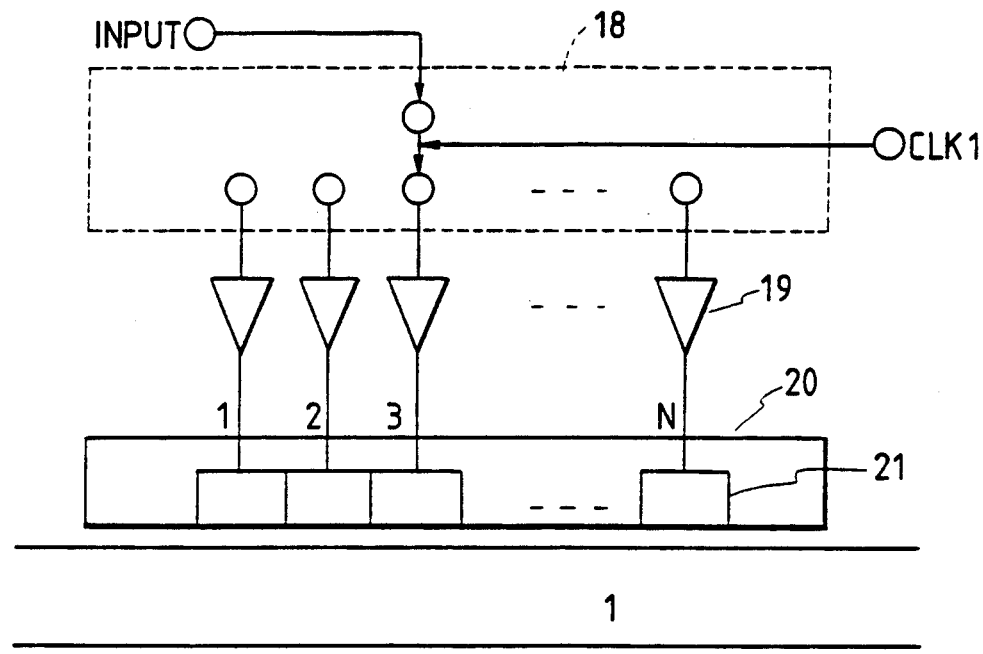
FIG. 25 is an illustration of a recording head section in the embodiments.
Figure 26:
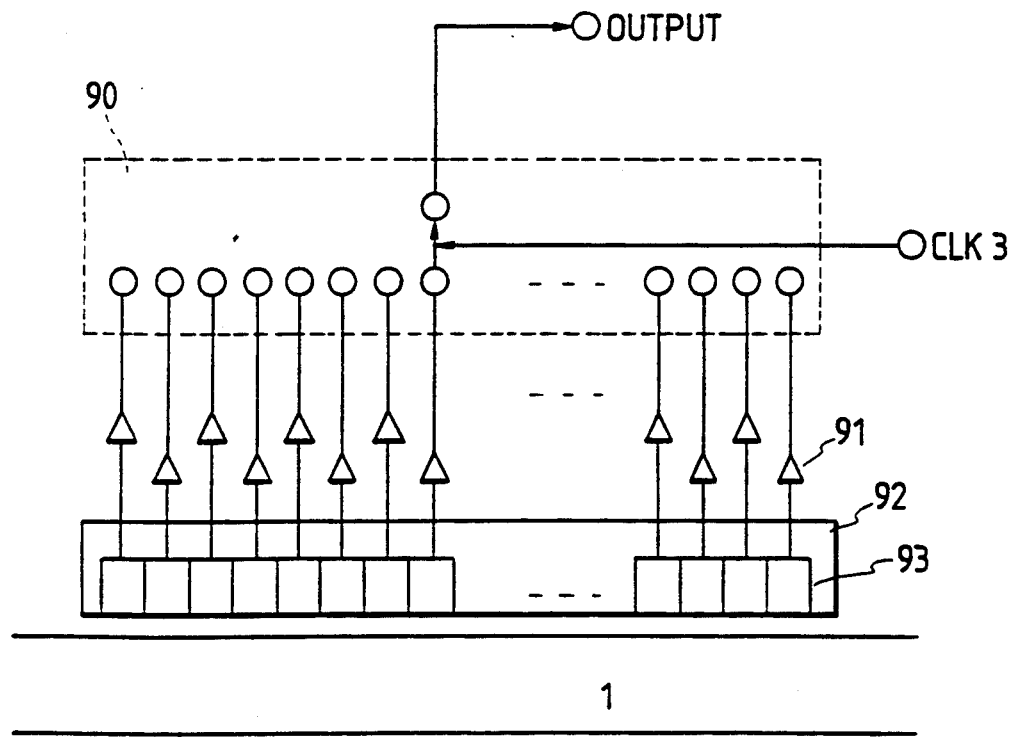
FIG. 26 is an illustration of a reproducing head section in the embodiments.

A description will be made hereinbelow in terms of a third embodiment of this invention with reference to FIG. 23. Parts corresponding to those in FIGS. 4 or 5 are marked with the same numerals and the description thereof will be omitted for brevity. In FIG. 23, illustrated at numeral 88 is a reproducing head section which is coupled to a reproduction signal detecting section 89. The reproducing head section 88 includes reproducing subheads whose number is K greater than two times (2N) of the the number N of the recording subheads of a recording head section 12. The reproduced signal picked up by the reproducing head section 88 is supplied to the reproduction signal detecting section 89 in order to eliminate the ISI between the adjacent codes and the crosstalk between the adjacent tracks so that a reproduced signal without the waveform interference and crosstalk and a reproduction synchronizing signal are together fed to a data detector 15. FIG. 25 shows an arrangement of the recording head section 12 and FIG. 26 illustrates an arrangement of the reproducing head section 88. The FIG. 25 recording head section arrangement is substantially the same as the FIG. 6 arrangement and therefore the description thereof will be omitted. In FIG. 26, the reproducing head section 88 comprises a multiplexer 90, reproducing sub-amplifiers 91 and a reproducing head 92 comprising reproducing subheads 93 whose number is k as described above. The width of the reproducing sub-head 93 is ½ of the width of the recording sub-head. The following description will be made under the conditions that N=5 and K=14.

Figure 29:
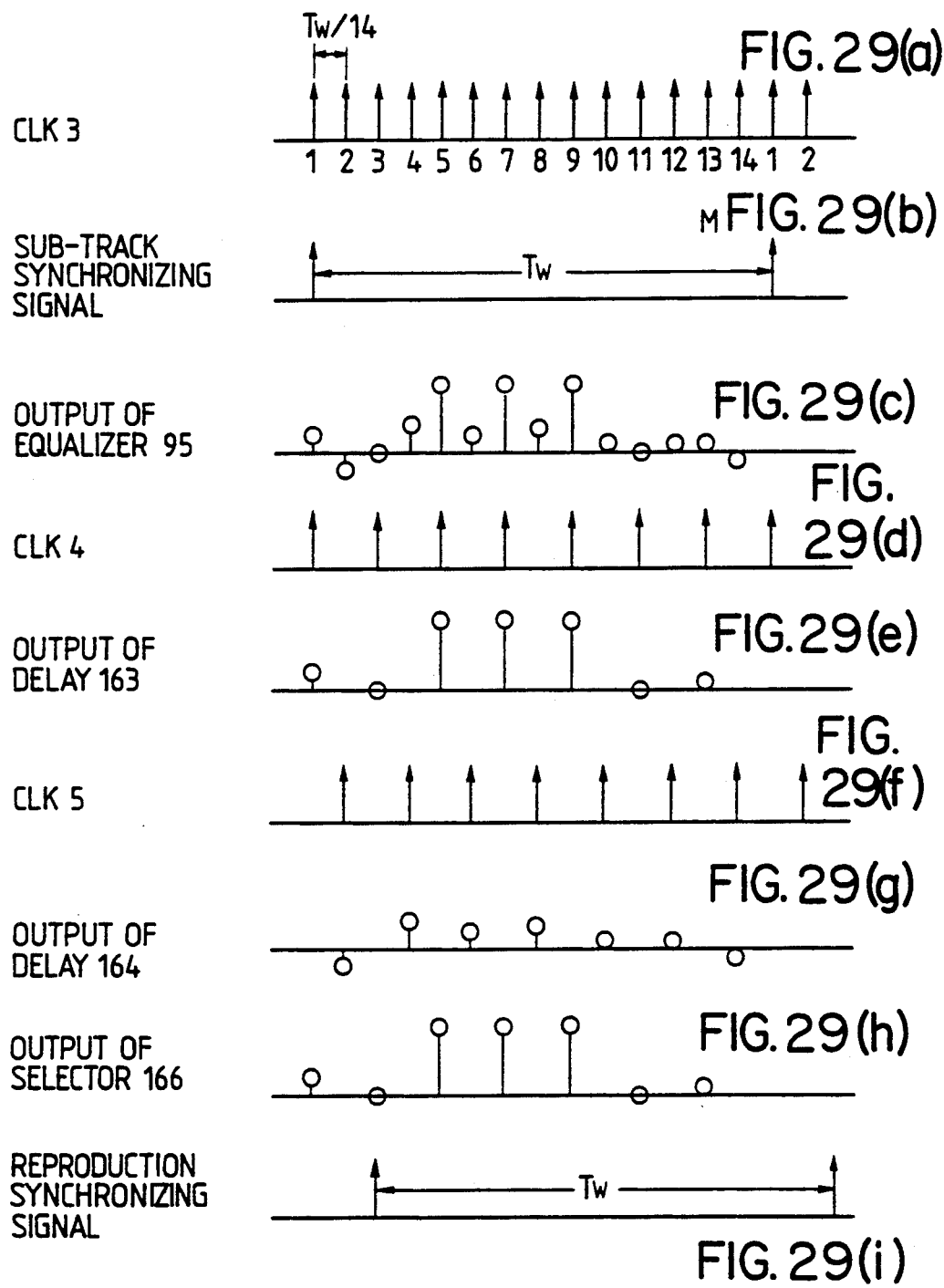
FIGS. 29a to 29i are a timing illustration for describing operation of the reproducing head section.

The respective outputs of the reproducing sub-heads 93 are supplied to the reproducing sub-amplifiers 91, whose number is K, so as to be reproduction-amplified. The multiplexer 90 is operable in response to a processing clock CLK3 so as to time-division-multiplex the outputs of the reproducing sub-amplifiers 91. FIG. 29 is an illustration for describing the reproducing operation. In FIG. 29, (b) illustrates a sub-track synchronizing signal whose period is coincident with the period Tw of the channel bit rate of the recording signal. Since it is required to process the signals from the reproducing sub-tracks whose number is K within one period of the sub-track synchronizing signal, the period of the operation processing clock for the multiplexer 90 is set to be Tw/K. Thus when K=14, the period becomes Tw/14 as illustrated in (a) of FIG. 29.

Figure 28:
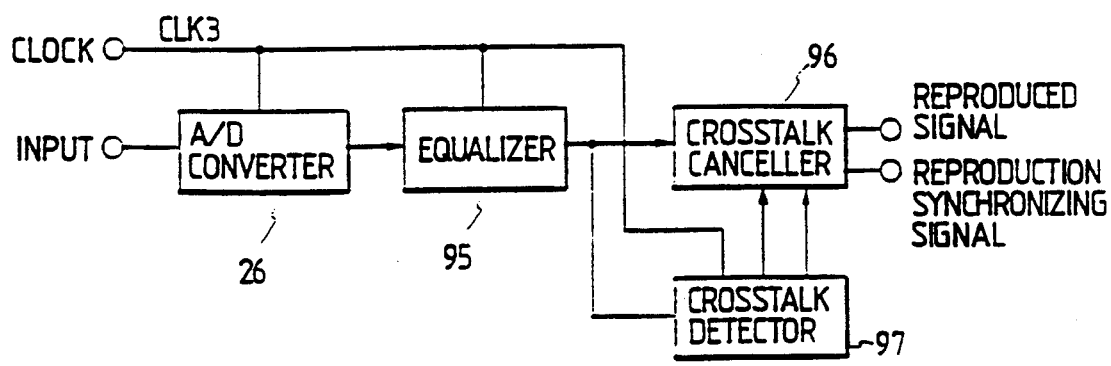
FIG. 28 is a block diagram showing an arrangement of a reproduction signal detecting section in the embodiments.

The reproduction signal detecting section 89 will be described hereinbelow with reference to FIG. 28. In FIG. 28, illustrated at numeral 95 is an equalizer which is responsive to the output of an A/D converter 26, so that the output thereof is supplied to a crosstalk canceller 96 and further to a crosstalk detector 97. The A/D converter 26 samples and quantizes the time-division-multiplexed signal in response to the processing clock CLK3. The equalizer 95 eliminates the ISI between the adjacent codes from the output of the A/D converter 26.

Figure 27:
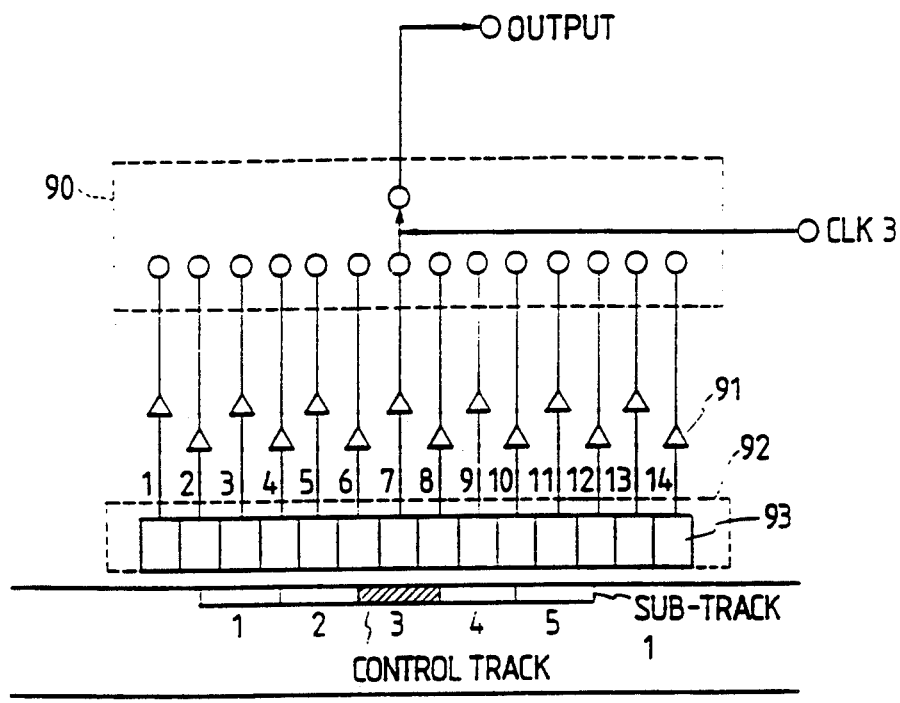
FIG. 27 is an illustration for describing the relation in position between the reproducing head section and the recording track.

With reference to FIG. 27, since reproducing sub-heads 93 have a pitch which is ½ of the pitch of the recording sub-heads, the odd-number reproducing sub-heads 93 after the third reproducing sub-heads 93 accurately trace the recording sub-tracks. Thus, if selecting the signals reproduced by the odd-number reproducing sub-heads 93 or even-number reproducing sub-heads 93 in the FIG. 27 reproducing head section 88, it is possible to obtain accurate reproduced signals, thereby simplifying the arrangements of the crosstalk detector 97 and the crosstalk canceller 96.

The crosstalk detector 97 derives the control signal from the output signal of the equalizer 95 so as to check whether the track including the control signal is accurately traced by the odd-number reproducing sub-head 93 or the even-number reproducing sub-head 93. The crosstalk canceller 96 selectively outputs, on the basis of the output signal of the crosstalk detector 97, one of the signal reproduced by the odd-number reproducing sub-head and the signal reproduced by the even-number reproducing sub-head, thereby eliminating the crosstalk between the adjacent tracks.

Figure 30:
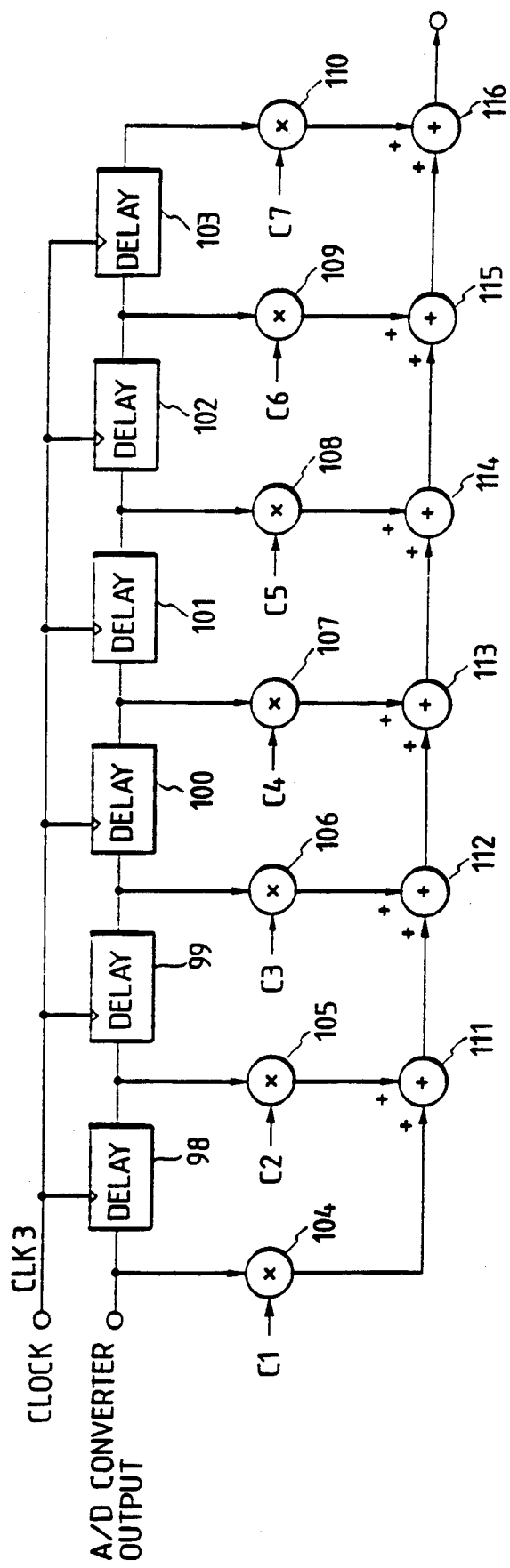
FIG. 30 is a circuit arrangement of an equalizer of the reproduction signal detecting section.
Figure 31:
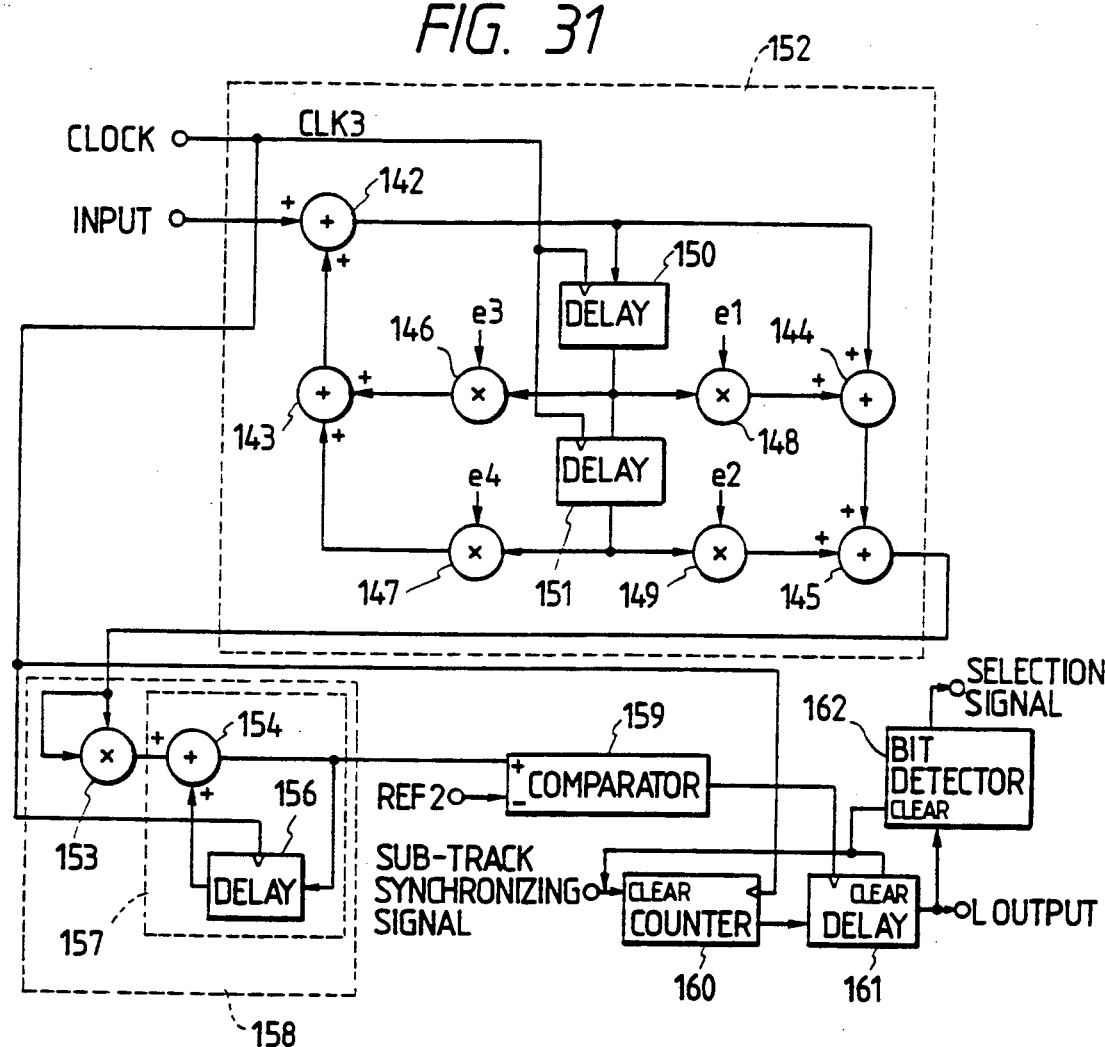
FIG. 31 is a circuit arrangement of a crosstalk detector of the reproduction signal detecting section.
Figure 32:
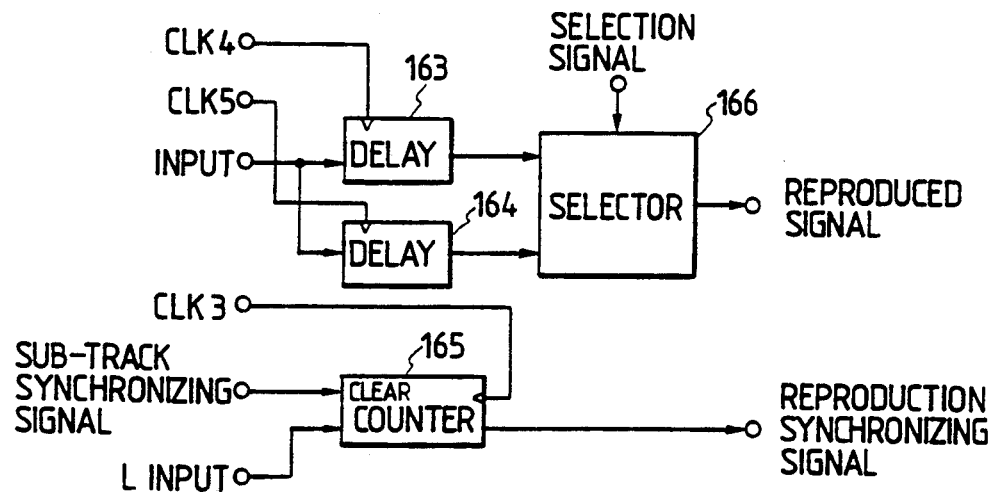
FIG. 32 is a block diagram showing an arrangement of a crosstalk canceller of the reproduction signal detecting section.

A further description will be made hereinbelow with reference to FIGS. 30, 31 and 32. FIG. 30 is a circuit diagram showing the equalizer 95 of the reproduction signal detecting section 89, FIG. 31 is a circuit diagram showing the crosstalk detector 97 thereof and FIG. 32 is a circuit diagram showing the crosstalk canceller 96 thereof. In FIG. 30, the equalizer 95 comprises delays 98 to 103, multipliers 104 to 110 and adders 111 to 116. In FIG. 31, the crosstalk detector 97 includes adders 142 to 145, multipliers 146 to 149, delays 150, 151, a BPF 152, an adder 154, delay 156, a LPF 157, a multiplier 153, a level detector 158, a delay 161, a comparator 159, a down counter 160 and a bit detector 162. The BPF 152 comprises the adders 142 to 145, the multipliers 146 to 149 and the delays 150, 151. The LPF 157 comprises the adder 154 and delay 156. The level detector 158 comprises the multiplier 153 and the LPF 157. In FIG. 32, the crosstalk canceller 96 is composed of delays 163, 164, a counter 165 and a selector 166.

As illustrated in FIG. 30, the equalizer 95 is constructed as a 7-tap transveral filter. Since the number K of the reproducing sub-tracks is 14 and the clock for the delays 98 to 103 whose delay amount is 14 is the same as the sampling clock CLK3 for the A/D converter 26, the outputs of the delays 98 to 103 become signals obtained by sampling and quantizing the outputs of the same reproducing sub-head at every tap. The multipliers 104 to 110 respectively multiply the tap outputs by coefficients C1 to C7 and the adders 111 to 116 perform the addition of the outputs of the multipliers 104 to 110. The characteristic of the equalizer 95 depends upon the values of the coefficients C1 to C7 of the multipliers 104 to 110 and is determined so as to reduce the interference between the adjacent codes.

Further, a description will be made hereinbelow in terms of the operation of the crosstalk detector 97 with reference to FIGS. 31 and 32, under the conditions that, as illustrated in FIG. 27 the number N of the recording sub-heads 21 is 5 and the number K of the reproducing sub-heads 93 is 14, and the control track of the recording sub-tracks is accurately traced by the seventh reproducing sub-head 93.

Since the shift amount Δ between the recording track and the reproducing head section 88 is calculated in relation to the control track, the relative position relation between the control track and the reproducing head 92 is calculated therefor. However, the seventh reproducing sub-head 93 is not required to calculate the decimal time shift amount α of the recording sub-track in order to accurately trace the control track. Accordingly, the shift amount Δ is given as follows.

$$\Delta = L \quad (12)$$

where L: the reproducing sub-head which accurately traces the control track, L=a+6.

The crosstalk detector 97 detects the control signal by the BPF 152 and detects the absolute value of the control signal by the level detector 158 and then calculates the relative position relation L between the recording sub-track and the reproducing head section 88.

In FIG. 33, (a) denotes the processing clock CLK3, the BPF 152 being operated in response to the processing clock CLK3, (b) shows the sub-track synchronizing signal, and (c) illustrates one example of the output signal of the equalizer 95. The BPF 152 is of the narrow-band type to output a signal whose frequency is near the frequency of the control signal. Further, in FIG. 33, (d) illustrates the output waveform of the BPF 152. The multiplier 153 raises its input signal to the second power, (e) showing the output signal of the multiplier 153 which is converted from the BPF 152 signal so as to have the positive sign only. The LPF 157 low-frequency-filters the output signal of the multiplier 153 so as to reduce the residual noise component, (f) showing the output signal of the LPF 157 in which the residual noise component is reduced as compared with the output waveform (e) of the multiplier 153. The relative position relation Δ between the recording sub-track and the reproducing head section 88 is equal to the integer-part shift amount L of the sub-track. Since the maximum value of L is 14, 4 bits are assigned therefor.

On the outputs of the LPF 157, the value of the reproduced signal of the seventh reproducing sub-head 93 becomes maximum because the seventh reproducing sub-head 93 accurately traces the control track. As illustrated in (f) of FIG. 33, the comparator 159 outputs "1" when the reproduced signal is greater than the comparison voltage REF2. Thus, the comparator 159 is operable in response to the seventh reproduced signal. The delay 161 is operated in accordance with the output of the comparator 159 which is used as the clock, and hence keep the value of the counter 160 when the reproduced signal becomes at a maximum. The delay 161 is cleared by the sub-track synchronizing signal. The counter 160 is cleared by the sub-track synchronizing signal and then counts the number of the reproducing sub-heads. With the above operation, it is possible to obtain the shift amount L. Further, the bit detector 162 outputs a selection signal for selecting the input of the selector 166 of the crosstalk canceller 96. When the shift amount L is an odd number, the selector 166 selects the output of the odd-number reproducing sub-head, and on the other hand when the shift amount L is an even number, the selector 166 selects the output of the even-number reproducing sub-head. The decision in terms of whether the shift amount L is an odd number or an even number is made by deciding the least significant bit (LSB) of the shift amount L by the bit detector 162. The bit detector 162 outputs "1" when the least significant bit of the shift amount L is "1" and outputs "0" when it is "0". In this case, since the shift amount L is an odd number, the bit detector 162 outputs "1". The bit detector 162 is cleared in response to the sub-track synchronizing signal. With the above operation, the bit detector 162 can output the selection signal.

Operation of the crosstalk canceller 96 will be described hereinbelow with reference to FIGS. 29 and 32. In FIG. 32, the delays 163 and 164 separate their inputs into the odd-number reproduced signals and even-number reproduced signals. The selector 166 selects the signals of the delays 163 and 164 in accordance with the selection signal to output a reproduced signal without crosstalk component. The counter 165 is cleared by the sub-track synchronizing signal and counts a value corresponding to the shift amount a between the recording sub-track and the reproducing head section 88 to output a reproduction synchronizing signal.

In FIG. 29, (a) shows the processing clock CLK3, (b) illustrates the sub-track synchronizing signal, and (c) denotes the output of the equalizer 95. Further (d) shows the clock CLK for the delay 163 corresponds to the odd-number clock CLK3 illustrated in (a) thereof. Thus, as illustrated in (e), the delay 163 outputs only the odd-number reproduced signals of the outputs of the equalizer 95. Still further, (f) designates the clock CLK5 for the delay 164 which corresponds to the even-number clock of the clock CLK3 shown in (a). Thus, as illustrated in (g), the delay 164 outputs the even-number reproduced signals of the outputs of the equalizer 95. In this case, since the shift amount L is 7 which is an odd-number, the output of (e) becomes an accurate reproduced signal. Since the signal of the bit detector 162 is "1", the selector 166 selects the output of the delay 163, i.e., the odd-number reproduced signal. In FIG. 29, (h) shows the output signal of the selector 166, i.e., the reproduced signal, and (i) illustrates the signal outputted from the counter 165, i.e., the reproduction synchronizing signal which represents the head position of the reproduced signal. The reproduced signal and the reproduction synchronizing signal are supplied to the data detector 15 of FIG. 23.

With the above-described arrangement, in addition to the above-mentioned effects, it is possible to simplify the circuit arrangement of the reproduction signal detecting section because the number of the reproducing sub-heads is set to be K, and since the reproduced signal can be obtained by accurately tracing the recording track, it is possible to further narrow the track pitch to increase the recording capacity.

Figure 24:
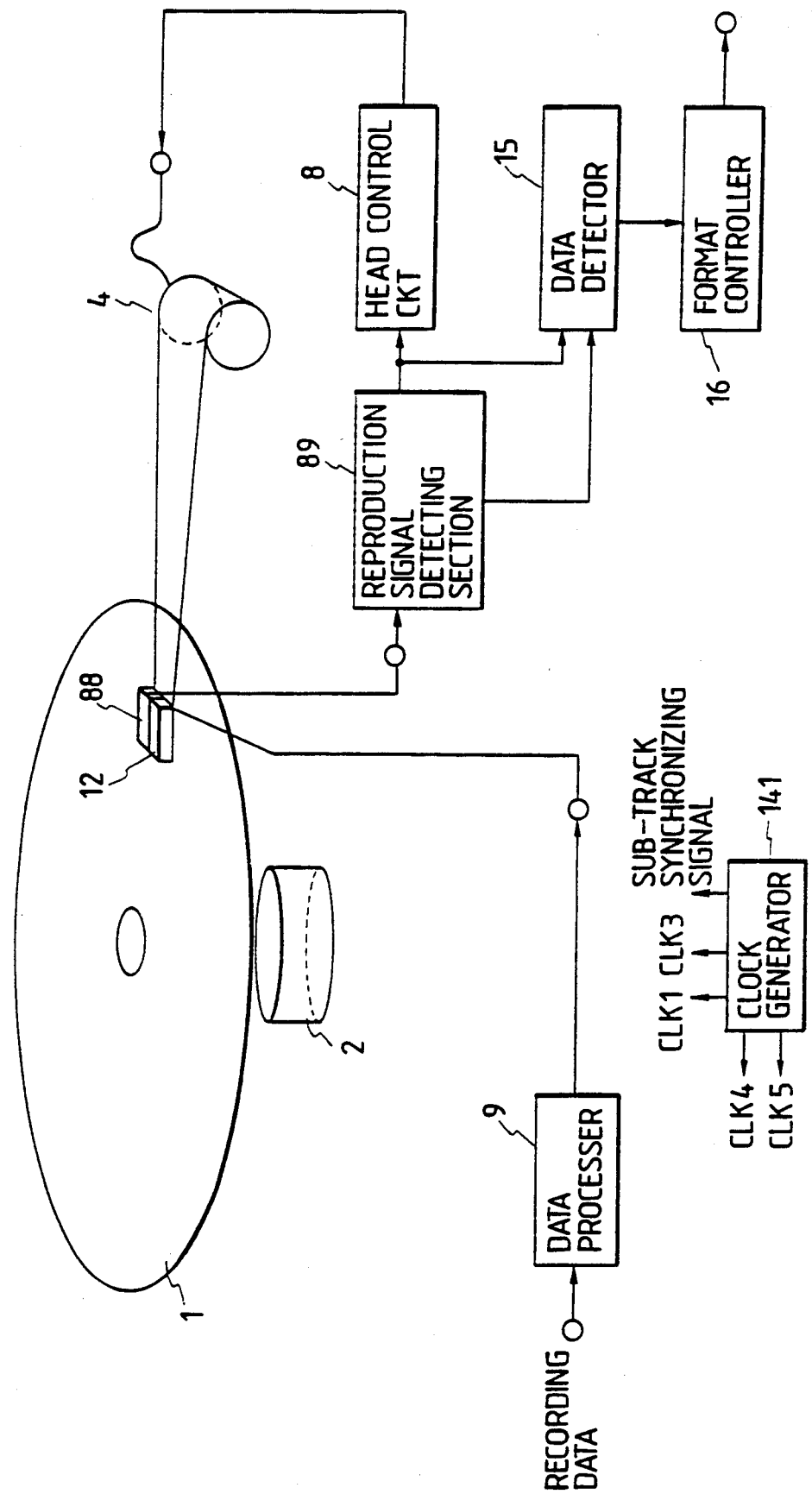
FIG. 24 shows an arrangement of a signal recording/reproducing apparatus according to a fourth embodiment of this invention.

FIG. 24 shows a signal recording/reproducing apparatus according to a fourth embodiment of this invention. In FIG. 24, further provided is a head control circuit 8 between the reproduction signal detecting section and a head drive section 4 for the tracking control of the reproducing head section 88, whereby it is possible to still further increase the track density to improve the recording capacity.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A signal recording/reproducing apparatus comprising:
    a recording head section having recording sub-heads for recording signals inputted from an external circuit to simultaneously form a recording track comprising recording sub-tracks, whose number is N, on a recording medium;
    a reproducing head section for simultaneously tracing, for reproduction, said recording sub-tracks formed on said recording medium, said reproducing head section having reproducing sub-heads whose number is M and whose pitch is equal to a pitch of said recording sub-tracks, the number M of said reproducing sub-heads being greater than the number N of said recording sub-tracks; and
    a reproduction signal detecting section for detecting the recorded signals from the reproduced signals due to said M reproducing sub-heads.

2. A signal recording/reproducing apparatus as claimed in claim 1, further comprising a head control section for controlling said recording head section and said reproducing head section on the basis of the output signal of said reproduction signal detecting section so that the tracing direction is substantially coincident with a longitudinal direction of said recording track.

3. A signal recording/reproducing apparatus as claimed in claim 1, wherein said reproduction signal detecting section includes:
    M-channel reproducing amplifiers coupled to said reproducing head section for amplifying the reproduced signals corresponding to said N sub-tracks on said recording medium;
    analog switch means for time-division-multiplexing the outputs of said M-channel reproducing amplifiers
    analog-to-digital converter means for sampling and quantifying the output of said analog switch means;

equalizer means for performing an equalization of the output of said analog-to-digital converter means with a same characteristic;

crosstalk detector means for detecting control signal levels on the basis of M reproduction signals outputted from one of the output of said analog-to-digital converter means and the output of said equalizer means so as to calculate a crosstalk amount on the basis of the detected control signal levels and to output a crosstalk level signal indicative of the calculated crosstalk amount; and crosstalk canceller means for separately deriving the reproduced sub-track signals from the output of said equalizer means in accordance with the crosstalk level signal outputted from said crosstalk detector means.

4. A signal recording/reproducing apparatus as claimed in claim 1, wherein said reproduction signal detecting section includes:

M-channel reproducing amplifiers coupled to said reproducing head section for amplifying the reproduced signals corresponding to said N sub-tracks on said recording medium;

analog switch means for time-division-multiplexing the outputs of said M-channel reproducing amplifiers;

analog-to-digital converter means for sampling and quantifying the output of said analog switch means;

crosstalk canceller means for separately deriving the reproduced sub-track signals from the output of said equalizer means in accordance with a crosstalk level signal;

crosstalk detector means for detecting a crosstalk level on the basis of the output signal of said crosstalk canceller means; and accumulator means for low-frequency-filtering and accumulating the output of said crosstalk detector means so as to produce said crosstalk level signal which is in turn supplied to said crosstalk canceller means.

5. A signal recording/reproducing apparatus as claimed in claim 4, further comprising equalizer means provided between said analog-to-digital converter means and said crosstalk canceller means for performing an equalization of the output of said analog-to-digital converter means with a same characteristic, said crosstalk canceller means deriving the reproduced sub-track signal from the output of said equalizer means in accordance with the crosstalk level signal.

6. A signal recording/reproducing apparatus as claimed in claim 1, wherein said recording head section is arranged to form a recording format in which there are no guard bands or narrow guard bands whose widths are smaller than those of sub-tracks between the formed recording sub-tracks and there are guard bands whose widths are greater than those of sub-tracks between the formed tracks.

7. A signal recording/reproducing apparatus as claimed in claim 6, wherein a signal for detection of said crosstalk level is recorded in at least one of said recording sub-tracks.

8. A signal recording/reproducing apparatus as claimed in claim 1, wherein said recording head section, said reproducing head section and said reproduction signal detecting section function, in combination, for reducing crosstalk, increasing data transfer rate and increasing recording capacity of the medium.

9. A signal recording/reproducing apparatus arranged to increase the recording capacity of a recording medium, eliminate crosstalk between adjacent tracks on said recording medium and improve the transfer rate, said signal recording/reproducing apparatus comprising:

a recording head section having recording sub-heads for recording signals inputted from an external circuit to simultaneously form a recording track comprising recording sub-tracks, whose number is N, on said recording medium;

a reproducing head section for simultaneously tracing, for reproduction, said recording sub-tracks formed on said recording medium, said reproducing head section having reproducing sub-heads whose number is K and whose pitch is equal to ½ of a pitch of said recording sub-tracks, the number K of said reproducing sub-heads being greater than twice the number N of said recording sub-tracks; and a reproduction signal detecting section for detecting the recorded signals from the reproduced signals due to said K reproducing sub-heads.

10. A signal recording/reproducing apparatus as claimed in claim 9, further comprising a head control section for controlling said recording head section and said reproducing head section on the basis of the output signal of said reproduction signal detecting section so that the tracing direction is substantially coincident with a longitudinal direction of said recording track.

11. A signal recording/reproducing apparatus as claimed in claim 8, wherein said reproduction signal detecting section includes:

K-channel reproducing amplifiers coupled to said reproducing head section for amplifying the reproduced signals corresponding to said N sub-tracks on said recording medium;

analog switch means for time-division-multiplexing the outputs of said K-channel reproducing amplifiers analog-to-digital converter means for sampling and quantifying the output of said analog switch means;

equalizer means for performing an equalization of the output of said analog-to-digital converter means with a same characteristic;

crosstalk detector means for detecting control signal levels on the basis of M reproduction signals outputted from one of the output of said analog-to-digital converter means and the output of said equalizer means so as to calculate a crosstalk amount on the basis of the detected control signal levels and to output a crosstalk level signal indicative of the calculated crosstalk amount; and crosstalk canceller means for separately deriving the reproduced sub-track signals from the output of said equalizer means in accordance with the crosstalk level signal outputted from said crosstalk detector means.

12. A signal recording/reproducing apparatus as claimed in claim 9, wherein said recording head section is arranged to form a recording format in which there are no guard bands or narrow guard bands whose widths are smaller than those of sub-tracks between the formed recording sub-tracks and there are guard bands whose widths are greater than those of sub-tracks between the formed tracks.

13. A signal recording/reproducing apparatus as claimed in claim 12, wherein a signal for detection of said crosstalk level is recorded in at least one of said recording sub-tracks.

* * * * *